(12) United States Patent
Bell et al.

(10) Patent No.: US 12,301,558 B1
(45) Date of Patent: *May 13, 2025

(54) SECURE GENERATION OF AUTHENTICATION DATASETS FROM NETWORK ACTIVITY

(71) Applicant: Wells Fargo Bank, N.A., San Francisco, CA (US)

(72) Inventors: Thomas E. Bell, San Francisco, CA (US); Peter Bordow, Fountain Hills, AZ (US); Julio Jiron, San Bruno, CA (US); Akhlaq M. Khan, San Francisco, CA (US); Volkmar Scharf-Katz, San Francisco, CA (US); Jeff J. Stapleton, Arlington, TX (US); Richard Orlando Toohey, San Francisco, CA (US); Ramesh Yarlagadda, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/893,961

(22) Filed: Aug. 23, 2022

(51) Int. Cl.
    *H04L 9/40* (2022.01)

(52) U.S. Cl.
    CPC .......... *H04L 63/083* (2013.01); *H04L 63/102* (2013.01)

(58) Field of Classification Search
    CPC .................. H04L 63/083; H04L 63/102
    See application file for complete search history.

(56) References Cited

U.S. PATENT DOCUMENTS

| | | | |
|---|---|---|---|
| 7,133,846 | B1 | 11/2006 | Ginter et al. |
| 7,673,797 | B2 | 3/2010 | Edwards |
| 8,234,387 | B2 | 7/2012 | Bradley et al. |
| 8,446,275 | B2 | 5/2013 | Utter, Ii |
| 8,731,977 | B1 | 5/2014 | Hardin et al. |

(Continued)

FOREIGN PATENT DOCUMENTS

| | | |
|---|---|---|
| CA | 2478548 C | 3/2014 |
| DE | 10 2021 108 925 A1 | 10/2022 |
| WO | WO-2011/016710 A1 | 2/2011 |
| WO | WO-2016/083987 A1 | 6/2016 |
| WO | WO-2019/013818 A1 | 1/2019 |
| WO | WO-2019/123291 A1 | 6/2019 |

OTHER PUBLICATIONS

Jain, et al., A Blockchain-Based distributed network for Secure Credit Scoring, 2019 5th International Conference on Signal Processing, Computing and Control (ISPCC), 306-12, Oct. 2019; ISBN-13: 978-1-7281-3988-3.

(Continued)

*Primary Examiner* — Yonas A Bayou
(74) *Attorney, Agent, or Firm* — Foley & Lardner LLP

(57) ABSTRACT

Disclosed are example methods, systems, and devices that allow for secure generation of authentication datasets from network activity. The techniques include accessing secured data sources to generate a first dataset of secured data, and extracting information from one or more unsecured data sources to generate a second dataset comprising a second dataset. A third set of data elements can be generated from the first and second datasets, and may be utilized to authenticate credentials that can be utilized to access secured data via a network. The techniques can transmit indications that credentials are invalid if the credentials fail to satisfy aspects of the third dataset.

20 Claims, 6 Drawing Sheets

(56) References Cited

U.S. PATENT DOCUMENTS

| | | |
|---|---|---|
| 8,756,153 B1 | 6/2014 | Rolf |
| 8,831,972 B2 | 9/2014 | Angell et al. |
| 8,965,803 B2 | 2/2015 | Jung et al. |
| 9,087,058 B2 | 7/2015 | Neven et al. |
| 9,094,388 B2 | 7/2015 | Tkachev |
| 9,177,257 B2 | 11/2015 | Kozloski et al. |
| 9,443,298 B2 | 9/2016 | Ross et al. |
| 9,519,783 B2 | 12/2016 | Pruthi et al. |
| 9,558,397 B2 | 1/2017 | Liu et al. |
| 9,734,290 B2 | 8/2017 | Srinivas et al. |
| 9,864,992 B1 | 1/2018 | Robinson et al. |
| 10,024,684 B2 | 7/2018 | Wang |
| 10,044,700 B2 | 8/2018 | Gresham et al. |
| 10,075,445 B2 | 9/2018 | Chen et al. |
| 10,102,491 B2 | 10/2018 | Connolly et al. |
| 10,110,608 B2 | 10/2018 | Dureau |
| 10,127,378 B2 | 11/2018 | Toth |
| 10,142,362 B2 | 11/2018 | Weith et al. |
| 10,181,032 B1 | 1/2019 | Sadaghiani et al. |
| 10,210,527 B2 | 2/2019 | Radocchia |
| 10,218,510 B2 | 2/2019 | Kinney et al. |
| 10,313,336 B2 | 6/2019 | Giobbi |
| 10,362,027 B2 | 7/2019 | Eramian et al. |
| 10,387,695 B2 | 8/2019 | Engels et al. |
| 10,454,913 B2 | 10/2019 | Maninder et al. |
| 10,505,965 B2 | 12/2019 | Moyle et al. |
| 10,552,596 B2 | 2/2020 | Wang et al. |
| 10,572,778 B1 | 2/2020 | Robinson et al. |
| 10,614,302 B2 | 4/2020 | Withrow |
| 10,664,581 B2 | 5/2020 | Hou et al. |
| 10,740,767 B2 | 8/2020 | Withrow |
| 10,757,097 B2 | 8/2020 | Yocam et al. |
| 10,778,676 B1 | 9/2020 | Griffin et al. |
| 10,834,084 B2 | 11/2020 | Ouellette et al. |
| 10,855,679 B2 | 12/2020 | Rajakumar |
| 10,938,828 B1 | 3/2021 | Badawy et al. |
| 10,943,003 B2 | 3/2021 | Bingham et al. |
| 10,963,670 B2 | 3/2021 | Ross et al. |
| 10,977,353 B2 | 4/2021 | Bender et al. |
| 11,044,267 B2 | 6/2021 | Jakobsson et al. |
| 11,048,794 B1* | 6/2021 | Bordow ............... G06F 21/316 |
| 11,048,894 B2 | 6/2021 | Feldman |
| 11,055,390 B1 | 7/2021 | Kragh |
| 11,057,366 B2 | 7/2021 | Avetisov et al. |
| 11,068,909 B1 | 7/2021 | Land et al. |
| 11,075,904 B2 | 7/2021 | Jha et al. |
| 11,089,014 B2 | 8/2021 | Buscemi |
| 11,093,789 B2 | 8/2021 | Wang et al. |
| 11,100,503 B2 | 8/2021 | Iyer et al. |
| 11,127,092 B2 | 9/2021 | Kurian |
| 11,128,467 B2 | 9/2021 | Chapman et al. |
| 11,151,550 B2 | 10/2021 | Prabhu et al. |
| 11,157,907 B1 | 10/2021 | Kumar |
| 11,163,931 B2 | 11/2021 | Ricci |
| 11,200,306 B1 | 12/2021 | Singh |
| 11,205,011 B2 | 12/2021 | Jakobsson et al. |
| 11,223,646 B2 | 1/2022 | Cunningham et al. |
| 11,290,448 B1* | 3/2022 | Bordow ............... H04L 63/102 |
| 11,327,992 B1* | 5/2022 | Batsakis ............... H04L 63/083 |
| 11,451,532 B2* | 9/2022 | Arif Khan ............ G06N 20/10 |
| 11,461,298 B1 | 10/2022 | Shemmer et al. |
| 11,509,477 B1 | 11/2022 | Poder et al. |
| 11,514,155 B1* | 11/2022 | Bordow ............... H04L 63/102 |
| 11,522,867 B2* | 12/2022 | Han ..................... H04L 63/0876 |
| 11,669,611 B1* | 6/2023 | Bordow ............... H04L 63/102 |
| | | 726/6 |
| 12,034,719 B2 | 7/2024 | Budman et al. |
| 2003/0086341 A1 | 5/2003 | Wells et al. |
| 2006/0129478 A1 | 6/2006 | Rees |
| 2007/0078908 A1 | 4/2007 | Rohatgi et al. |
| 2008/0022370 A1 | 1/2008 | Beedubail et al. |
| 2008/0120302 A1 | 5/2008 | Thompson |
| 2009/0089107 A1 | 4/2009 | Angell et al. |
| 2009/0089205 A1 | 4/2009 | Bayne |
| 2012/0237908 A1 | 9/2012 | Fitzgerald et al. |
| 2014/0200885 A1 | 7/2014 | Diggins |
| 2015/0112732 A1 | 4/2015 | Trakru et al. |
| 2015/0220999 A1 | 8/2015 | Thornton et al. |
| 2015/0317728 A1 | 11/2015 | Nguyen |
| 2016/0050557 A1* | 2/2016 | Park ..................... H04W 12/04 |
| | | 455/419 |
| 2016/0162882 A1 | 6/2016 | McClung, III |
| 2016/0224773 A1 | 8/2016 | Ramaci |
| 2016/0335629 A1 | 11/2016 | Scott |
| 2017/0012992 A1* | 1/2017 | Doctor ................. H04L 63/08 |
| 2017/0063831 A1* | 3/2017 | Arnold ................. H04L 9/3226 |
| 2017/0063946 A1 | 3/2017 | Quan et al. |
| 2017/0111351 A1* | 4/2017 | Grajek ................. H04L 63/083 |
| 2017/0230351 A1* | 8/2017 | Hallenborg ............ H04L 63/08 |
| 2017/0236037 A1 | 8/2017 | Rhoads et al. |
| 2018/0068103 A1 | 3/2018 | Pitkäºnen et al. |
| 2018/0205546 A1 | 7/2018 | Haque et al. |
| 2019/0095916 A1 | 3/2019 | Jackson |
| 2019/0098500 A1 | 3/2019 | Chen et al. |
| 2019/0149539 A1* | 5/2019 | Scruby ................. H04L 63/083 |
| | | 713/168 |
| 2019/0163889 A1 | 5/2019 | Bouse |
| 2019/0205939 A1 | 7/2019 | Lal et al. |
| 2019/0296913 A1 | 9/2019 | Verma et al. |
| 2019/0334724 A1 | 10/2019 | Anton et al. |
| 2020/0036709 A1 | 1/2020 | Mars et al. |
| 2020/0211031 A1 | 7/2020 | Patil |
| 2020/0236113 A1 | 7/2020 | Monica et al. |
| 2020/0266985 A1 | 8/2020 | Covaci et al. |
| 2020/0311678 A1 | 10/2020 | Fletcher et al. |
| 2020/0320619 A1 | 10/2020 | Motaharian et al. |
| 2020/0374311 A1 | 11/2020 | Madhu et al. |
| 2020/0380598 A1 | 12/2020 | Spector et al. |
| 2021/0027061 A1 | 1/2021 | Xu et al. |
| 2021/0029100 A1 | 1/2021 | Bendersky et al. |
| 2021/0089637 A1 | 3/2021 | Cummins et al. |
| 2021/0104008 A1 | 4/2021 | Ross et al. |
| 2021/0110004 A1 | 4/2021 | Ross et al. |
| 2021/0134434 A1 | 5/2021 | Riley et al. |
| 2021/0202067 A1 | 7/2021 | Williams et al. |
| 2021/0231706 A1 | 7/2021 | Pak |
| 2021/0234673 A1 | 7/2021 | Kurian et al. |
| 2021/0234693 A1 | 7/2021 | Kurian et al. |
| 2021/0240837 A1 | 8/2021 | Tseng et al. |
| 2021/0258155 A1 | 8/2021 | Andon et al. |
| 2021/0279475 A1 | 9/2021 | Tusch et al. |
| 2021/0297259 A1 | 9/2021 | Rahn et al. |
| 2021/0325427 A1 | 10/2021 | Jain et al. |
| 2021/0326467 A1 | 10/2021 | Levy et al. |
| 2021/0366014 A1 | 11/2021 | Wang et al. |
| 2021/0366586 A1 | 11/2021 | Ryan et al. |
| 2021/0399895 A1 | 12/2021 | Abadir et al. |
| 2022/0004616 A1 | 1/2022 | Eisen et al. |
| 2022/0086141 A1 | 3/2022 | Mossler et al. |
| 2022/0292396 A1 | 9/2022 | Biryukov et al. |
| 2022/0345451 A1 | 10/2022 | Hitchcock et al. |
| 2023/0097761 A1 | 3/2023 | Martin de la Bastide et al. |
| 2023/0334476 A1 | 10/2023 | Rule et al. |
| 2023/0403144 A1 | 12/2023 | Rhodin |
| 2024/0039537 A1 | 2/2024 | Kumar et al. |
| 2024/0064135 A1 | 2/2024 | Sherlock et al. |
| 2024/0185536 A1 | 6/2024 | Neuschäfer et al. |
| 2024/0185660 A1 | 6/2024 | Masood |
| 2024/0214194 A1 | 6/2024 | Kapur et al. |
| 2024/0256878 A1 | 8/2024 | Palleti et al. |
| 2024/0340314 A1 | 10/2024 | Radon et al. |
| 2024/0346085 A1 | 10/2024 | Soon-Shiong |

OTHER PUBLICATIONS

Yan Zhang et al., Real-time Machine Learning Prediction of an Agent-Based Model for Urban Decision-making, URL: https://ifaamas.org/Proceedings/aamas2018/pdfs/p2171.pdf (Jul. 10-15, 2018).

* cited by examiner

SECURE GENERATION OF AUTHENTICATION DATASETS FROM NETWORK ACTIVITY

TECHNICAL FIELD

The present disclosure relates to secure generation of authentication datasets from network activity.

BACKGROUND

Client applications can access resources from servers. In many cases, applications utilize authenticating information to permit access information related to a user. However, obtaining or generating authenticating information is an inherently insecure and therefore challenging process.

SUMMARY

One aspect of the present disclosure relates to a method implemented by a first computing system comprising a server. The method may include accessing a secured data source to generate a first dataset including a first set of user data elements in the secured data source. The secured data source may be local or remote to a first computing system. The method may include extracting information from one or more unsecured internet data sources to generate a second dataset including a second set of user data elements in the one or more unsecured internet data sources. The unsecured internet data sources may be remote to the first computing system and are maintained by one or more other computing systems that are unfederated with respect to the first computing system. The method may include generating a third set of user data elements including data elements found in both the first set of user data elements and the second set of user data elements. The method may include providing, over the internet, to a user device of a user, a secured web portal including a registration page. The method may include receiving, via the registration page, a user credential to be used to gain access to the secured web portal. The method may include determining that the user credential corresponds to a data element in the third set of user data elements. The method may include transmitting to the user device, by the first computing system, an indication that the user credential is rejected. The method may include receiving, via the registration page, an alternative user credential. The method may include determining that the alternative user credential is not in the third set of user data elements. The method may include registering the alternative user credential to a user account. The method may include granting, via a login page of the secured web portal, access to the user account based on the alternative user credential.

In some implementations, the method can include determining an assurance metric for the third set of user data elements. In some implementations, the assurance metric may be based at least in part on a number of data sources in which the third set of user data elements was found. In some implementations, the assurance metric may be based at least in part on a characteristic of the one or more of the unsecured internet data sources. In some implementations, the secured data source may be a first database maintained by the first computing system.

In some implementations, the data elements in the secured data source were obtained directly from the user. In some implementations, the secured data source may be a second database maintained by a second computing system that is unfederated with respect to the first computing system. In some implementations, accessing the secured data source may include transmitting an application programming interface (API) call to the second computing system. In some implementations, the API call may include a security token identifying the first computing system and/or the user.

In some implementations, extracting the information from the one or more unsecured internet data sources may include web scraping the information from one or more web pages. In some implementations, extracting the information from the one or more unsecured internet data sources may include web scraping the information from a plurality of web pages of a plurality of other computing systems that are unfederated with respect to the first computing system. In some implementations, the user credential may be a passcode. In some implementations, the user credential may be a response to a security question provided via the registration page.

Another aspect of the present disclosure relates to a system. The system can include a first computing system comprising a server. The system can access a secured data source to generate a first dataset including a first set of user data elements in the secured data source. The secured data source may be local or remote to a first computing system. The system can extract information from one or more unsecured internet data sources to generate a second dataset including a second set of user data elements in the one or more unsecured internet data sources. The unsecured internet data sources may be remote to the first computing system and are maintained by one or more other computing systems that are unfederated with respect to the first computing system. The system can generate a third set of user data elements including data elements found in both the first set of user data elements and the second set of user data elements. The system can provide, over the internet, to a user device of a user, a secured web portal including a registration page. The system can receive, via the registration page, a user credential to be used to gain access to the secured web portal. The system can determine that the user credential corresponds to a data element in the third set of user data elements. The system can transmit to the user device, by the first computing system, an indication that the user credential is rejected. The system can receive, via the registration page, an alternative user credential. The system can determine that the alternative user credential is not in the third set of user data elements. The system can register the alternative user credential to a user account. The system can grant, via a login page of the secured web portal, access to the user account based on the alternative user credential.

In some implementations, the system can determine an assurance metric for the third set of user data elements. In some implementations, the assurance metric may be based at least in part on a number of data sources in which the third set of user data elements was found. In some implementations, the assurance metric may be based at least in part on a characteristic of the one or more of the unsecured internet data sources. In some implementations, the secured data source may be a first database maintained by the first computing system. In some implementations, the data elements in the secured data source were obtained directly from the user.

In some implementations, the secured data source may be a second database maintained by a second computing system that is unfederated with respect to the first computing system. In some implementations, accessing the secured data source may include transmitting an application programming interface call to the second computing system. In some implementations, the API call may include a security token identifying the first computing system, the user, or both the first computing system and the user.

In some implementations, extracting the information from the one or more unsecured internet data sources may include web scraping the information from one or more web pages. In some implementations, extracting the information from the one or more unsecured internet data sources may include web scraping the information from a plurality of web pages of a plurality of other computing systems that are unfederated with respect to the first computing system. In some implementations, the user credential may be a passcode. In some implementations, the user credential may be a response to a security question provided via the registration page.

Yet another aspect of the present disclosure is directed to a method for executing one or more machine-learning models to detect recurrent data relating to network security. The method implemented by a first computing system comprising a server. The method may include generating a first dataset including security elements corresponding to one or more accounts administered by the first computing system. The one or more accounts may include a first account. The security elements may include one or more credentials granting access to the first account via the server. The method may include obtaining network access to one or more secured data sources. The one or more secured data sources may include a second computing system that is unfederated with respect to the first computing system. The method may include accessing the one or more secured data sources to generate a second dataset based on data in the second computing system. The method may include extracting, from one or more unsecured data sources including a third computing system that is unfederated with respect to the first computing system, a third dataset based on data in the third computing system. The method may include applying a machine-learning model to the second dataset and the third dataset to generate a fourth dataset including recurrent data elements the machine-learning model including a natural language processing model. The method may include determining, based on the first dataset and the fourth dataset, that a network security threat corresponding to the first account exceeds a threshold. The method may include receiving, via a login page of a web portal, a request to access the first account. The method may include transmitting an indication that replacement credentials are required to access the first account. The method may include receiving, via the web portal, one or more replacement credentials, and determining that the one or more replacement credentials are acceptable based on the fourth dataset. The method may include registering the one or more replacement credentials to the first account. The method may include granting, via the web portal, access to the first account based on the one or more replacement credentials.

In some implementations, the method can include providing the web portal with a registration page for registering for a digital security service. In some implementations, the method can include receiving, via the registration page, a request to register for the digital security service. In some implementations, the network access to the one or more secured data sources may be obtained based on inputs received via the registration page of the web portal. In some implementations, the one or more credentials granting access to the first account may include a passcode. In some implementations, the one or more credentials granting access to the first account may include a response to a security question corresponding to the first account.

In some implementations, the second dataset may include one or more documents. In some implementations, the second dataset may include one or more audio recordings. In some implementations, the second dataset may include one or more video recordings. In some implementations, extracting the third dataset may include web scraping data from one or more web pages. In some implementations, the third dataset may include information on, an indication of, or otherwise indicate a data breach by a compromised computing system. In some implementations, the method can include determining that the compromised computing system likely stored data on a user of the first account.

In some implementations, determining that the compromised computing system likely stored data on the user may be based at least partly on account activity in the first account. In some implementations, the account activity may identify an electronic transaction with an entity corresponding to the compromised computing system. In some implementations, accessing the one or more secured data sources may include periodically retrieving data from the one or more secured data sources. In some implementations, periodically retrieving data from the one or more secured data sources may include transmitting a plurality of API calls to the second computing system.

In some implementations, one or more API calls may be transmitted to the second computing system on a weekly basis. In some implementations, the one or more API calls may include a security token identifying the first computing system. In some implementations, the one or more API calls may include a security token identifying the first account.

Another aspect of the present disclosure relates to a system for executing one or more machine-learning models to detect recurrent data relating to network security. The system can include a first computing system comprising a server. The system can generate a first dataset including security elements corresponding to one or more accounts administered by the first computing system. The one or more accounts may include a first account. The security elements may include one or more credentials granting access to the first account via the server. The system can obtain network access to one or more secured data sources. The one or more secured data sources may include a second computing system that is unfederated with respect to the first computing system. The system can access the one or more secured data sources to generate a second dataset based on data in the second computing system. The system can extract, from one or more unsecured data sources including a third computing system that IS unfederated with respect to the first computing system, a third dataset based on data in the third computing system. The system can apply a machine-learning model to the second dataset and the third dataset to generate a fourth dataset including recurrent data elements the machine-learning model including a natural language processing model. The system can determine, based on the first dataset and the fourth dataset, that a network security threat corresponding to the first account exceeds a threshold. The system can receive, via a login page of a web portal, a request to access the first account. The system can transmit an indication that replacement credentials are required to access the first account. The system can receive, via the web portal, one or more replacement credentials, and determining that the one or more replacement credentials are acceptable based on the fourth dataset. The system can register the one or more replacement credentials to the first account. The system can grant, via the web portal, access to the first account based on the one or more replacement credentials.

In some implementations, the system can provide the web portal with a registration page for registering for a digital security service. In some implementations of the system, the system can receive, via the registration page, a request to register for the digital security service.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
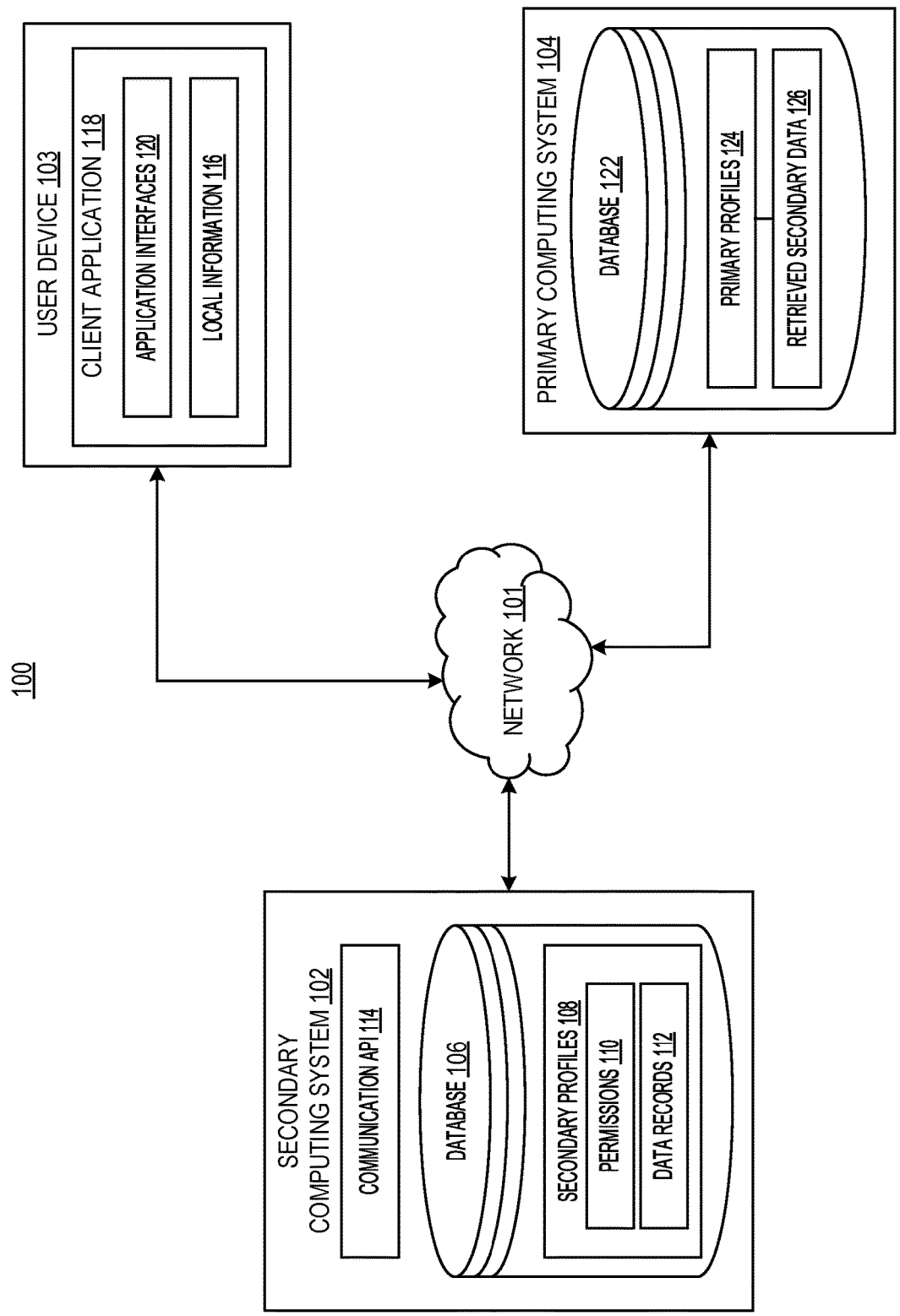
FIG. 1 is a block diagram of an example system for secure generation of authentication datasets from network activity, in accordance with one or more example implementations.

Below are detailed descriptions of various concepts related to, and implementations of, techniques, approaches, methods, apparatuses, and systems for secure generation of authentication datasets from network activity. The various concepts introduced above and discussed in detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes techniques for secure generation of authentication datasets from network activity;

Section B describes techniques for executing machine-learning models to detect recurrent data relating to network security; and Section C describes a computing environment which may be useful for practicing embodiments described herein.

A. Secure Generation of Authentication Datasets from Network Activity

Various embodiments described herein relate to systems and methods for secure generation of authentication datasets from network activity (e.g., social networking, Short Message Service (SMS), Simple Mail Transfer Protocol (SMTP), and/or other network activities). Computer network security is paramount because modern computer networks are often utilized to share or transmit private or otherwise personally identifying information. Hackers or other malicious network entities can hijack, crack, phish or otherwise gain access to such information by circumventing network security systems, and may utilize this information for identity theft or for other nefarious purposes. Users of such computer networks are not aware of or are not equipped to deal with new or emergent techniques that aim to acquire their personal information. Yet, users often engage in behavior that reveals information about themselves during their day-to-day lives, which can be accessed and utilized by potential fraudsters to fraudulently impersonate the user. In an example, users may regularly reveal personal information through social media or other public or semi-private channels.

Embodiments described herein can automatically scrape or otherwise access information relating to users to establish a framework to protect the users from potential fraudsters. Various Internet databases, webpages, or other sources of public or semi-private information can be extracted using various techniques (e.g., monitoring online activity or electronic activity history, web scraping, obtaining data via smart devices such as Internet of Things (IoT) devices, accessing social networking accounts, etc.) can be utilized to generate network access credentials. These credentials can be generated from information that is known privately to the user, but is not revealed in any public database or otherwise available on the Internet to a potential fraudster. The techniques described herein can automatically scrape, process, and generate such credentials without user involvement. In addition, the techniques described herein can be utilized to generate an assurance metric for how available or prevalent certain information is, or how difficult it is for a potential fraudster or other malicious entity to obtain the information. The metric for certain information can be generated on various factors, including but not limited to, the number of sources that store a portion of user information, the number of times the information is shared, or the degree to which the information is accessible.

The assurance score can be generated for any portion of user information in a user identity construct maintained by a secure computing system, and can be used to enhance various security measures. For example, certain security questions, answers to security questions, or passwords can be generated for a user that are easily recalled or provided by a user, but also have an assurance metric that is above a particular threshold (e.g., indicating that the information is likely unavailable to a fraudster). This enables a user to easily access their own information without relying on third-party tools, such as password managers or customer service representatives. If attempts are made to perform one or more electronic activities at the secure computing system using information of the user that is associated with a low assurance metric, the lower confidence in the information might indicate a potentially higher likelihood of identity theft. The secure computing system can generate an alert indicating that the activity is potentially fraudulent, and may generate additional security measures to access the information (e.g., prompting enhanced security questions or requesting additional private user information, etc.). The present techniques increase the overall security of networked computing systems, including the automatic detection and flagging of information that may otherwise be easily falsified or used to impersonate a user.

Referring to FIG. 1, illustrated is a block diagram of an example system 100 for secure generation of authentication datasets from network activity, in accordance with one or more example implementations. The system 100 may include a secondary computing systems 102 (e.g., which may include one or more computing devices of third-party enterprises in one or more locations), a user device 103 (which may include multiple computing devices of one or more users in one or more locations), and a primary computing system 104. Each of the secondary computing system 102, the primary computing system 104, and the user device(s) 103 can be in communication with one another via the network 101. The network 101 can facilitate communications among the secondary computing system 102, the user device 103, and the primary computing system 104 over, for example, the internet or another network via any of a variety of network protocols such as Ethernet, Bluetooth, Cellular, or Wi-Fi.

Each component so the system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

The secondary computing system 102 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The secondary computing system 102 can include one or more computing devices or servers that can perform various functions as described herein. The secondary computing system 102 can include any or all of the components and perform any or all of the functions of the computer system 600 described herein in conjunction with FIG. 6.

The secondary computing systems 102 may be computing systems of information technology service providers, social media platforms, webservers, chatrooms, forums, or any other computing system that may maintain information about or relating to one or more users, and also provides such information to the public or in a semi-private environment. For example, secondary computing systems 102 of non-financial institutions may be associated with marketing platforms, social media platforms, network environment platforms, network configuration platforms, or user databases, among others. The secondary computing systems 102 may each include one or more network interfaces that facilitate communication with other computing systems of the system 100 via the network 101. In some implementations, one or more of the secondary computing systems may be owned or controlled by a single entity.

The user device 103 can include at least one processor and a memory (e.g., a processing circuit). The memory can store processor-executable instructions that, when executed by a processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The user device 103 can include one or more computing devices or servers that can perform various functions as described herein. The user device 103 can include any or all of the components and perform any or all of the functions of the computer system 600 described herein in conjunction with FIG. 6.

The user device 103 may include mobile or non-mobile devices, such as smartphones, tablet computing devices, wearable computing devices (e.g., a smartwatch, smart optical wear, etc.), personal computing devices (e.g., laptops or desktops), voice-activated digital assistance devices (e.g., smart speakers having chat bot capabilities), portable media devices, vehicle information systems, or the like. The user device 103 may access one or more software applications running locally or remotely. The user device 103 may operate as a "thin client" device, which presents user interfaces for applications that execute remotely (e.g., at the trusted computing system 102, the secondary computing system(s) 104, etc.). The user device 103 can be associated with a respective device identifier. The identifier may be a universally unique identifier (UUID), a globally unique identifier (GUID), a media access control (MAC) address, an internet protocol (IP) address, a device serial number, a serial number of a component of the user device 103, a predetermined or randomly generated value associated with the user device 103, or any type of identifier that identifies the user device 103 or the components thereof.

Input from the user received via the user device 103 may be communicated to the server (e.g., the primary computing system 104) executing the remote application, which may provide additional information to the user device 103 or execute further operations in response to the user input. In some examples, a user may access any of the computing devices of the system 100 through various user devices 103 at the same time or at different times. For example, the user may access one or more computing systems of the system 100 via a digital assistance device 103 while also accessing one or more computing systems of the system 100 using a wearable computing device 103 (e.g., a smart watch). In other examples, the user may access one or more computing systems of the system 100 via a digital assistance device 103 and later access the system 100 via a vehicle information system 103, via desktop computing system, or a laptop computing system.

The user device 103 can execute a client application 118, which may provide one or more user interfaces and receive user input via one or more input/output (I/O) devices. The client application 118 may be provided by or be associated with the primary computing system 104 or the secondary computing system 102. In some implementations, the client application 118 may be a web-based application that is retrieved and displayed in a web-browser executing at the primary computing system 104 or the secondary computing system 102. In some implementations, the client application 118 can execute locally at the user device 103 and may communicate information with the secondary computing systems 102 or the primary computing system 104 via the network 101. The client application 118 can access one or more device identifiers using an application programming interface (API) of an operating system of the user device 103. In some implementations, the client application 118 can access a predetermined region of memory where the user device 103 stores one or more device identifiers.

The client application 118 may present one or more application interfaces 120, for example, in response to user input or interactions with displayed interactive user interface elements. The application interfaces 120 may include user interfaces that capture user information in various fields or interactive user interface elements. Such user interface elements may include fields that capture or present authentication credentials to access secure applications or resources hosted by the primary computing system 104. For example, the application interfaces 120 may include text or other instructions that display a prompt on the display of the user device 103 to provide an answer to one or more security questions, enter a username or password, or provide email information. The fields may also provide authorization information for other, third-party computing systems, such as the secondary computing system 102, which enables the primary computing system 104 to access one or more profiles for the user (e.g., the secondary profiles 108) maintained by the secondary computing system 104. The application interfaces 120 can include any type of interactive user interface element, including those that enable a user to provide information that can be stored in the primary profiles 124, send requests, or to navigate between user interfaces of the client application 118.

The client application 118 executing on the user device 103 can include local information 116, which may include stored preferences (e.g., personal user settings, saved login information, stored authentication credentials, etc.) or other information relating to the use of the client application 118. The local information 116 can be stored in the memory of the user device 103, and can be accessed and modified by the user by accessing corresponding application interfaces 120 of the client application 118. In some implementations, the local information 116 can be transmitted to the primary computing system 104 for storage in the primary profile 124 of the user. The user, when accessing a client application 118 on a different device, can access the primary computing system 104 using an identifier of the primary profile 124 (e.g., and login to the primary computing device 104), and synchronize (e.g., download and store) the local information 116 on the different device.

The primary computing system 104 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The primary computing system 104 can include one or more computing devices or servers that can perform various functions as described herein. The primary computing system 104 can include any or all of the components and perform any or all of the functions of the computer system 600 described herein in conjunction with FIG. 6.

The primary computing system 104 can be a computing system of an entity that maintains user profiles (e.g., the primary profiles 124) for a number of different users. The primary computing system 104 can provide information to the client application 118 executing on the user devices 103, such as user interfaces, instructions to carry out one or more functionalities described herein, or other information relating to the primary profiles 124. The user can utilize the client application 118 to communicate with the primary computing system 104, for example, to create, modify, delete, or authorize information in connection with a primary profile 124 associated with the user. In some implementations, the primary computing system 104 can be backend computer system that interacts with the user devices 103 and supports various services offered by the primary computing system 104, such as information technology (IT) services or network management services. The network management services may utilize the information in one or more of the primary profiles 124 to manage information communicated via the network 101.

The primary computing system 104 can maintain, manage, or store primary profiles 124, for example, in one or more data structures in the memory of or a database managed by the primary computing system 104. Each of the primary profiles 124 may correspond to a respective user, and may be identified by a corresponding user identifier (e.g., a username, an email address, a passcode, an encryption key, etc.). The primary profiles 124 can include any information about the user, including personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), or other user or account data that is maintained or otherwise accessible to the primary computing system 104. The primary computing system 104 can receive the primary profiles 124 or subsets thereof via the client application 118, for example, by way of user input.

Figure 2:
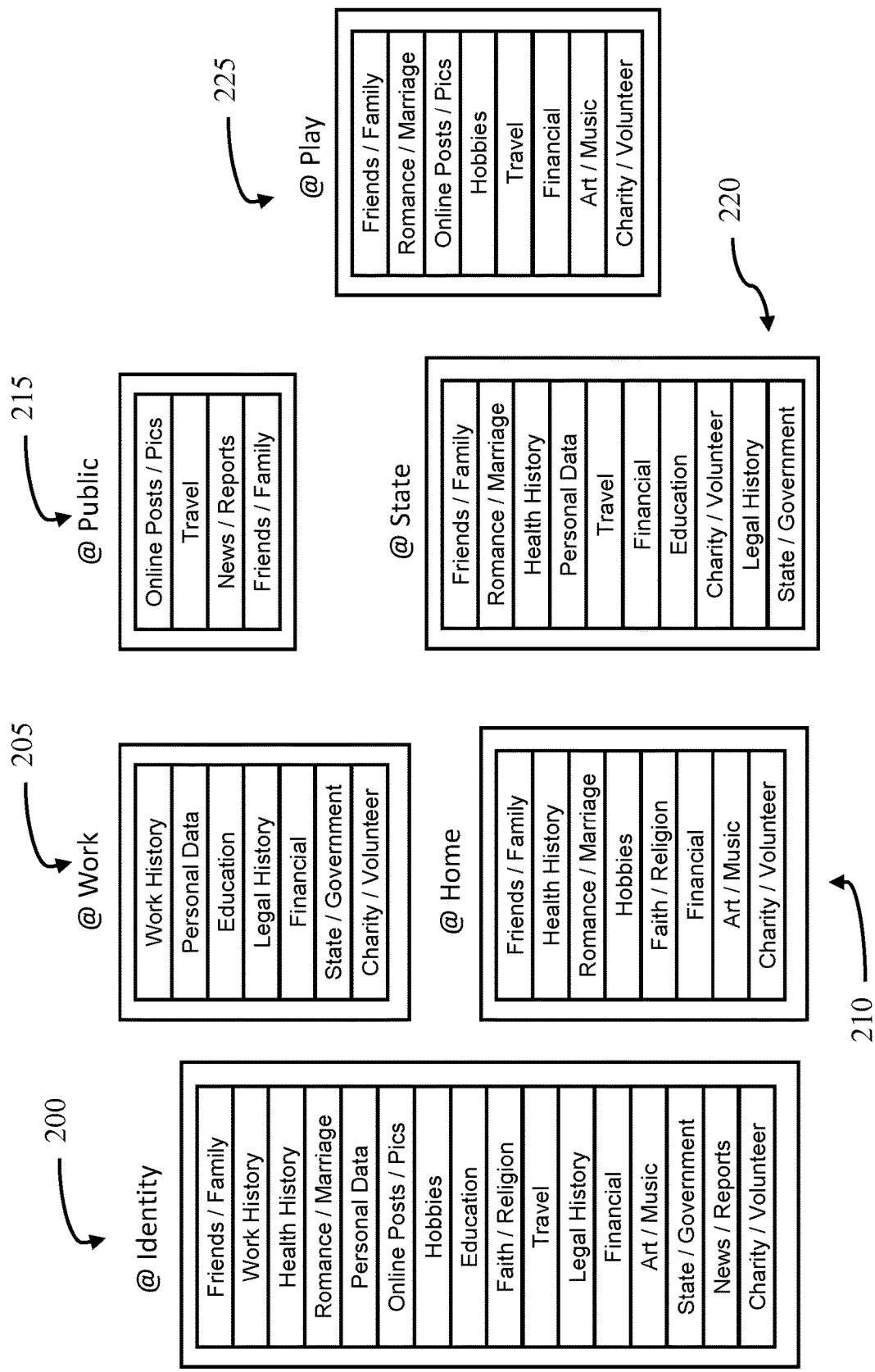
FIG. 2 illustrates a representation of an example set of contexts in which identity elements may be generated or used, or are otherwise relevant, in accordance with one or more example implementations.

A representation of various data elements that may be stored in a primary profile 124 is shown in FIG. 2. Referring to FIG. 2, illustrated is a representation of an example set of identity elements that may be generated or stored in a primary profile 124. As shown, subsets of identity databank 200 ("@identity") may include, for example: an "@work" subset 205 with identity elements related to, for example, "work history" and "education"; an "@home" subset 210 with identity elements related to, for example, "friends/family" and "romance/marriage"; an "@public" subset 215 with identity elements related to, for example, "online posts/pics" and "news/reports"; an "@state" subset 220 with identity elements related to, for example, "legal history" and "state/government"; and an "@play" subset 225 with identity elements related to, for example, "hobbies" and "travel." These different categories provide context for the arrays of identity elements in the identity databank of a user.

Referring back to FIG. 1, each of the identity elements that are stored in the primary profile 124 may be stored in association with an assurance score, which may be calculated using the techniques described herein. The assurance score can be a metric that indicates whether the particular identity element is public or private information (e.g., whether one would be able to derive the identity element from publicly available information). The primary computing system 124 can periodically, or in response to a request, update the assurance scores of each identity element, such that the assurance scores accurately reflect the availability of the corresponding information. Identity elements or other user data in the primary profile 124 that has an assurance score that is above a predetermined threshold (e.g., not publicly available) can be referred to herein as "private information," while identity elements or other user data in the primary profile 124 that has an assurance score that is below a threshold (e.g., potentially available to the public) may be referred to herein as "public information."

The primary profiles 124 can be stored in association with one or more identifiers of one or more user devices 103. Identifiers of a primary profile 124 can be used by a client application 118 (e.g., with an authentication credential) to access the functionality of the primary computing system 104, which may include information relating to account functionality. The primary profile 124 may identify one or more accounts associated with the user. The identifiers of the primary profiles 124 can include a username, a password, an e-mail address, a phone number, a personal identification number (PIN), a secret code-word, or device identifiers for use in a two-factor authentication technique, among others. The primary profiles 124 can store information about, and be associated with, retrieved secondary data 126 (which may include information retrieved from the data records 112 stored at the secondary computing systems 102, as described herein), with which the primary computing system 104 can generate or verify authentication credentials (e.g., security questions, passwords, passcode, passphrase, secret code words, PIN numbers, answers to knowledge based authentication (KBA) questions, one time passcodes (OTPs) via text or email message (e.g., SMS or SMTP), public key certificate digital signature challenge responses, biometric verification, CVV or other numbers or values from credit cards or identification documents, etc.). Generally, the primary profiles 124 can include any information about a user that is not readily available to the public, such as data obtained from the user and kept confidential (e.g., not shared with other entities without the user's permission, or only shared with a limited number of trusted entities for specific uses to provide the user with requested services, etc.).

The primary profiles 124 can store one or more attributes of the user device 103 or the user of the user device 103. For example, the attributes can include a client device identifier of a user device 103 that was used to interact with the primary computing system 104, identifiers of one or more secondary computing systems 102 associated with the primary profile 124, or information relating to the user, among other information. The primary profiles 124 can also include historic records of online activity that the user has performed using the corresponding primary profiles 124, for example, at the primary computing system 104 or via other computing systems (e.g., the secondary computing system 104, other computing systems across the Internet, etc.), or the user device 103. The primary profiles 124 can store information about a user device 103 used to access the primary computing system 104, such as an Internet Protocol (IP) address, a MAC address, a GUID, an user profile name (e.g., the name of a user of the user device 103, etc.), device name, among others.

The primary profile 124 may be created by the primary computing system 104 in response to a primary profile 124 creation request transmitted by a user device 103. The user profile creation request can include any of the user profile information described herein. The primary profiles 124 can include information about an account (e.g., a financial account) maintained by an entity associated with the primary computing system 104. The information can include, for example, account balances, transaction histories, or brokerage trading information, among other account data. The attributes of the primary profiles 124 can include a list or table of secondary account identifiers (e.g., the secondary account data 126) associated with the primary profile 124. Additionally, a primary profile 124 can be updated with additional information using the client application 118. For example, the client application 118 can transmit information to store in the primary profile 124 in a request to update the primary profile 124. The primary computing system 104 may request an authentication credential (e.g., using techniques similar to those described herein), and can update the primary profile 124 with the information in the request upon determining that the authentication credential is legitimate. For example, the primary computing system 104 can verify that the authentication credential is valid and corresponds to an assurance score that is above a predetermined threshold.

The retrieved secondary data 126 can be associated with a respective primary profile 124, and can include information retrieved by the primary computing system 124 from the secondary computing systems 102 utilizing the techniques described herein. The retrieved secondary data 126 may be subsets of information stored as the data records 112 of the secondary computing systems 102. The retrieved secondary data 126 can include any data about the user that has been gathered via one or more computing systems other than the primary computing system 104 or directly from the user device 103 in a request to create or update a primary profile 124. This can include information scraped from websites, servers, or other online locations that the user may visit with one or more user devices 103, such as social media platforms, online chatrooms, online forums, public information databases, among other repositories of information. The primary computing system 104 can communicate with various computing systems of web services that the user is known to access (e.g., based on records of online activity transmitted to the primary computing system 104 via the client application 118 of the user device 103). This can include web scraping, communicating with the secondary computing system 102 via the communication API 114, among other information retrieval techniques.

The retrieved secondary data 126 may be periodically updated (e.g., scanned or retrieved) by the primary computing system 104 from the information sources, for example, according to a predetermined schedule. In some implementations, the retrieved secondary data 126 can be retrieved from the secondary computing systems 102 or other computing systems in response to a request received from a user device 103, or from a request received from another computing device (e.g., upon an indication of a data breach, etc.). For example, if the primary computing system 104 receives an indication that a data breach has occurred at an online server, the primary computing system 104 can access the breached information and update the retrieved secondary information 126 with any leaked information relating to the user. The primary computing system 104 can provide a subset of, or all of, the retrieved secondary data 126 to the user device 103 for display. In some implementations, information in the retrieved secondary data 126 and information in the primary profiles 124 can be utilized to perform targeted advertising, or to derive insights regarding a financial position of a user. For example, the primary computing system 104 can access transaction information received in the retrieved secondary information 126, for example, to determine income information and spending information over predetermined time periods.

The primary computing system 104 can utilize various information extraction techniques to extract the information about the user to generate the retrieved secondary data 126. For example, the primary computing system 104 can execute one or more natural language processing operations (e.g., executing machine-learning models) to scan through information efficiently. Scans of documents that may be stored at various information repositories can be scanned using image-to-text algorithms, such as optical character recognition, to extract the information about the user. In some implementations, optical character recognition can be used to extract sections of text from the image(s), and then regular expression (regex) rules can be applied to the sections of text to identify and extract the user data. The computing systems from which the retrieved secondary data 126 is retrieved or extracted can be unfederated with respect to the first computing system. For example, the primary computing system 104 and the secondary computing system 102 may be unfederated with respect to one another (e.g., maintained and operated by separate entities that do not generally share information, etc.).

The secondary computing system 102 can include at least one database 106, which may store secondary profiles 108. The secondary profiles 108 may be associated with a corresponding user, and may be similar to the primary profiles 124, but including information relating to the secondary computing system 102 rather than the primary computing system 104. The secondary profiles 108 can store corresponding data records 112, which can include information about the users associated with the respective secondary profile 108. The user devices 103 can access the respective secondary computing system 102 using the secondary profile 108 of the respective secondary computing system 102, and create, modify, or delete one or more data records 112 associated with the user's secondary profile 108. In an embodiment, the secondary profiles 108 can include private information relating to the respective user (e.g., that can only be shared according to the respective permissions 110).

Alternatively, one or more of the secondary profiles 108 can include public information that is generally accessible via the network 101.

The data records 112 may include any information about a user that accesses the secondary computing systems 102, including any information relating to interactions on web documents performed via a user device 103 in communication with the secondary computing system 102, information about online activity performed via the user device 103, or communication metadata (e.g., IP addresses, lists of device identifiers, etc.) relating to a user when the user communicates with the secondary computing system 102. The data records 112 can include data identifying a user of the secondary computing systems 102. For example, the data records 112 can include personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), and financial data (e.g., income, assets, credit score), or other user or account data that is maintained or otherwise accessible to one or more secondary computing systems 102.

In an embodiment, the secondary profile 108 may be a social media profile, a chat profile, or any other type of user profile associated with the user. Additionally, in some implementations, the data records 112 may be stored independently from a secondary profile 108, but may nonetheless include information relating to a user. For example, the data records 112 may be public webpages the report public information about various users. The information in such data records 112 can be scraped or otherwise retrieved as described herein (e.g., by the primary computing system 104). The data records 112 may include one or more identifiers of users. In another embodiment, the data records 112 can be records of social media activity, such as information relating to a user's social media posts, pictures, or online activity (e.g., records of purchases or other social media interactions, etc.). In such embodiments, the secondary computing system 102 may be an unsecured computing system (e.g., a computing system that published public information, or provides information to device with an internet connection that makes a corresponding request).

The secondary profiles 108 can be social media profiles that include one or more permissions 110 for accessing such information. The secondary profiles 108 may specify one or more permissions 110, which can be associated with corresponding data records 112 of a secondary profile 108. The permissions 110 can specify which of the data records 112 may be shared with the primary computing system 104. The permissions 110 can indicate time periods that certain data records 112 can be shared with or retrieved by the primary computing system 104. In some implementations, each of the data records 112 may be associated with default permissions 110, which can indicate that the data records 112 may not be shared with the primary computing system 104. The permissions 110 may be modified, for example, in response to one or more requests received from the client application 118 executing at the user device 103. In doing so, the user can utilize the client application 118 to permit the primary computing system 104 to access specified data records 112 of the secondary profile 108, while keeping other data records 112 private.

Although the secondary computing system 102 has been described as a social media platform, it should be understood that the secondary computing system 102 can be any type of computing system that can maintain a secondary profile 108.

Additionally, in certain embodiments, the secondary computing system 102 can store secured information that may be accessed by the primary computing system 104, and stored as part of the primary profile 124 (e.g., as private information, etc.). In such embodiments, the secondary computing system 102 may be a secured computing system that is unfederated with respect to the primary computing system 104. Alternatively, a secondary computing system 102 may be an unsecured computing system that maintains various information about one or more users publicly (e.g., on a public webpage or a webpage that is easily accessed with a registration process or behind a low-cost paywall, etc.). Any number of secondary computing systems 102, each of which may correspond to a respective computing platform, system, entity, or service, may be present in the system 100 and communicate with the user device 103 or the primary computing system 104 as described herein. The primary computing system 104 can access multiple secondary computing systems 102.

Information stored at the secondary computing systems 102 can be retrieved, for example, by the primary computing system 104 using the communication API 114. The secondary computing system 102 can maintain and provide the communications API 114. The communications API 114 can be an API, such as a web-based API corresponding to a particular network address uniform resource identifier (URI), or uniform resource locator (URL), among others. The communications API 114 can be accessed, for example, by one or more of the primary computing system 104 or the user device 103, via the network 101. In some implementations, other secondary computing systems 102 can communicate with a secondary computing system 102 via the communication API 114. The communications API 114 can be a client-based API, a server API (SAPI), or an Internet Server API (ISAPI). Various protocols may be utilized to access the communications API 114, including a representational state transfer (REST) API, a simple object access protocol (SOAP) API, a Common Gateway Interface (CGI) API, or extensions thereof. The communications API 114 may be implemented in part using a network transfer protocol, such as the hypertext transfer protocol (HTTP), the secure hypertext transfer protocol (HTTPS), the file transfer protocol (FTP), the secure file transfer protocol (FTPS), each of which may be associated with a respective URI or URL. The communications API may be exposed to the primary computing system 104, which can execute one or more API calls to perform the various operations described herein. In an embodiment, the primary computing system 104 includes an API that is similar to the communications API, which the user device 103 can use communicate with the primary computing system 104 to perform the various operations described herein.

Figure 3:
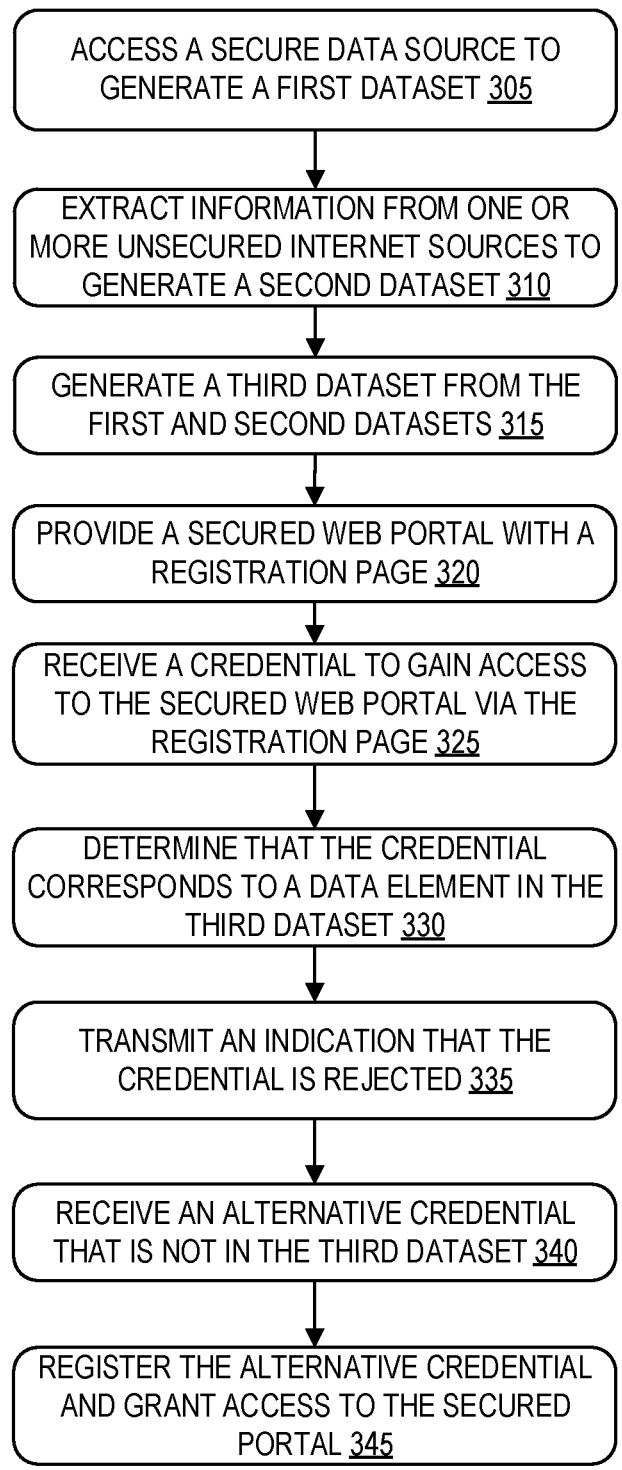
FIG. 3 is a flow diagram of an example method for secure generation of authentication datasets from network activity, in accordance with one or more example implementations.

Referring to FIG. 3, illustrated is a flow diagram of an example method 300 for secure generation of authentication datasets from network activity, in accordance with one or more example implementations. The method 300 can be a computer-implemented method. The method 300 may be implemented, for example, using any of the computing systems described herein, such as the primary computing system 104, the secondary computing system 102, the user device 103, or the computing system 600 described in connection with FIG. 6. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 300 may be performed simultaneously, or one or more operations may be performed as an alternative to another operation.

At step 305, the method 300 can include accessing a secured data source (e.g., the database 122) to generate a first dataset comprising a first set of user data elements in the secured data source. The secured data source may be accessed by a first computing system 104 (e.g., the secured data source is local or remote to the first computing system (e.g., the primary computing system 104). In an embodiment where the secured data source is remote, the secured data source may be a secondary computing system (e.g., the database 106 and the data records 112 of the secondary computing system 102). In an embodiment, accessing the secured data source to generate the first dataset can include retrieving information from a primary profile (e.g., the primary profile 124) associated with a user. The data elements in the secured data source can be obtained directly from various users and stored in respective primary profiles associated with each user. The primary profiles can include any information about the user that may be generally private information or otherwise not available to the public, including personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., account information, income, assets, credit score), or other private user or account data. In an embodiment, the first computing system can receive the data or subsets thereof via a client application (e.g., the client application 118 executing at the user device 103), for example, by way of user input.

The user inputs can include text data input to an application, or an image or frames of a video captured using an image sensor of the user device. For example, the application of the user device may prompt the user to capture one or more images of various documents (e.g., driver's license, social security card, medical documents, utility bills, etc.) that include identifying information about the user. The images can be stored in the memory of the computing device and can be utilized in an image processing function or algorithm that can extract pertinent information relating to the user from the image. For example, the computing device can execute a trained artificial intelligence model to identify regions of an image that are likely to correspond to pertinent details (e.g., blocks of text, etc.).

Natural language processing operations (e.g., executing additional machine-learning models or other types of image-to-text algorithms like optical character recognition) can be utilized to extract the information about the user. In some implementations, optical character recognition can be used to extract sections of text from the image(s), and then regular expression (regex) rules can be applied to the sections of text to identify and extract the user data. Machine-learning models may also be executed on retrieved text, image, video, or audio data to generate the first dataset. Some examples of machine learning models can include neural networks (e.g., a deep neural network (DNN), a convolutional neural network (CNN), a recurrent neural network (RNN) such as a long-short term memory (LSTM) model, combinations thereof, etc.), regression models (e.g., linear regression, sparse vector machine (SVM), logistic regression, polynomial regression, ridge regression, Lasso regression, Bayesian linear regression, etc.), or other types of classifiers (e.g., naïve Bayes, decision trees, k-nearest neighbor (KNN), extreme gradient boosting (XGBoost) models, etc.). The aforementioned machine-learning models may also be utilized for any type of machine-learning or artificial intelligence (AI) performed task described herein. In some implementations, multiple machine-learning models may be executed in a machine-learning pipeline to perform various operations described herein.

Additionally or alternatively, the first dataset can be generated by accessing a second database (e.g., the database 106) maintained by a second computing system (e.g., the secondary computing system 102) that is unfederated with respect to the first computing system. Unfederated computing systems are computing systems that are maintained, owned, and operated by separate entities that generally do not freely provide information to one another. To access such a database, the first computing system can execute or transmit an API call (e.g., the communications API 114) to the second computing system. The API call may include a security token identifying the first computing system or the user. For example, the security token may be transmitted in a request for information in the second database relating to the user.

In order to ensure that the user has authorized a transfer of their information from the second database, the secondary computing system can access permissions (e.g., the permissions 110) associated with one or more data records (e.g., the data records 112) associated with the user to determine whether the first computing system (e.g., the primary computing system 104) is authorized to access the data records. If the permissions do not permit access to the data records by the primary computing system, the secondary computing system can generate and transmit an alert to the first computing system indicating that the permissions are denied. If the permissions permit access to the data records by the primary computing system, the second computing system can transmit the requested information. Additionally or alternatively, the second computing system can verify a security token transmitted in the request for the user information.

For example, prior to receiving the request for the user's information, the user can utilize the client application on the user device to transmit a request for a security token to the second computing system. The request can indicate one or more portions of the user's data that the primary computing system is authorized to access (and any access rules such as time periods, expiration dates, etc.). In response, the second computing system can generate corresponding permissions, and generate a security token (e.g., using a hashing algorithm, a random number generator, or other token generation techniques) that acts as a surrogate value for those permissions. The second computing system can generate an association between the token and the user or the first computing system. The token is then provided to the user device, which can transmit the token to the primary computing system. The primary computing system can then utilize the token to request data for the first dataset from the second computing system. Upon receiving the security token, the second computing system compares the token to the security tokens that are associated with the user, and evaluates the permissions associated with the token as described herein (e.g., determining whether the first computing system is authorized to access the user data).

At step 310, the method 300 can include extracting information from one or more unsecured internet data sources to generate a second dataset. The second dataset can include a second set of user data elements. The second dataset can include information scraped from websites, servers, or other online locations that the user may visit with one or more user devices (e.g., the user devices 103), such as social media platforms, online chatrooms, online forums, public information databases, among other repositories of information. The first computing system can communicate with various computing systems of web services that the user may access (e.g., based on records of online activity transmitted to the first computing system via the client application of the user device). This can include web scraping, communicating with the secondary computing system via one or more communication APIs, among other information retrieval techniques.

The data sources from which the information is extracted can be unfederated with respect to the first computing system. Unfederated computing systems are computing systems that are maintained, owned, and operated by separate entities that generally do not freely provide information to one another. To perform web scraping, the first computing system can access and extract text information from one or more publicly available web pages. The first computing system can iterate through and traverse web pages by following hyperlinks to various URLs that are present on homepages of websites that are known to maintain information about various users. The first computing system can extract the information about the user by accessing web pages that may be associated with the user (e.g., include the user's name, address, or other publicly available information), or may be accessed by the user (e.g., based on previous electronic activity provided by the user device).

The first computing system can generate the second dataset (e.g., the retrieved secondary information 126) by storing the retrieved information in one or more data structures in the memory of the first computing system. The data structures can be stored in association with an identifier of the user to which the data structures correspond, and a timestamp identifying when the information was retrieved. The second dataset may be periodically updated (e.g., scanned or retrieved) by the first computing system from the information sources, for example, according to a predetermined schedule. In some implementations, information for the second dataset can be retrieved from various web servers or other computing systems in response to a request received from the user device, or from a request received from another computing device (e.g., upon an indication of a data breach, etc.). For example, if the first computing system receives an indication that a data breach has occurred at an online server or that previously private information has been leaked or released to the public, the first computing system can access the leaked or breached information and update the second dataset with any leaked information relating to the user.

At step 315, the method 300 can include generating, by the first computing system, a third set of user data elements comprising data elements found in both the first set of user data elements and the second set of user data elements. The third dataset can be a dataset of user data that may be both privately maintained information (e.g., part of a primary profile 124), as well as publicly available information (e.g., present in the second dataset). The third dataset may include data elements that correspond to elements in the first dataset, but may not exactly match the information contained therein, or may only be available to limited public data sources. Generally, the third dataset can include any information about the user in the second dataset for which there is any corresponding data in the first dataset. Generating the third dataset can include allocating a region of memory for the information in the third dataset, and iterating through each of the data elements in the second set and comparing those elements to potentially corresponding elements in the first dataset to identify a match. If a match is found, the data element can be stored in the third dataset. If a match is not found, the data element may not be included in the third dataset.

For each element in the third dataset, the first computing system can determined an assurance score. The assurance score can be a metric that indicates the degree to which the particular data element is public or private information (e.g., whether one would be able to derive the identity element from publicly available information). The first computing system can periodically, or in response to a request, update the assurance scores of each identity element in the third dataset, such that the assurance scores accurately reflect the availability of the corresponding information. Identity elements or other user data in the primary profile 124 that has an assurance score that is above a predetermined threshold (e.g., not publicly available) can be referred to herein as "private information," while identity elements or other user data in the primary profile 124 that has an assurance score that is below a threshold (e.g., potentially available to the public) may be referred to herein as "public information."

The assurance score (sometimes referred to as an "assurance metric") can be determined as a function of several factors. For example, the assurance metric can be determined at least in part based on a number of data sources in which the data element was identified. The first computing system can maintain a counter to count the number of public sources from which a particular data element was retrieved. If a data element is present in many public information sources (e.g., many webpages with very low or non-existent access barriers), the data element may have a lower assurance score (e.g., indicating that the data element is more likely to be public information). Other factors include the characteristics or types of data sources from which the data element was retrieved (e.g., the types of unsecured data sources, how much traversal was required to access the data element, etc.). Generally, information from more "niche" sources, like private forums, may indicate a higher assurance score than information present on large, popular social media platforms. Additionally, information that clearly associates the data element with the user (e.g., displayed in connection with the user's name on a social media profile page, etc.) can be associated with a lower assurance score than information that is displayed in a more ambiguous manner (e.g., not clearly associated with the user). The assurance score can be generated for any portion of user information in the third dataset, and can be used to enhance various security measures using the techniques described herein.

At step 320, the method 300 can include providing, to a user computing device of a user, a secured web portal comprising a registration page. The web portal can be a portal that can be utilized to access additional functionality of the first computing system. For example, the portal may be a web-enabled portal to access account information, alter user preferences, request various services, or to provide or upload private information relating to the user. In order to provide access to the web portal, the first computing system can provide one or more registration user interfaces that enable a user to provide registration information with which the user can access the web portal. The registration page may include various interactive user interface elements that can accept information provided by the user. The web portal including the registration page can be transmitted to the user device in the form of display instructions. The display instructions may include JavaScript, hypertext markup language 5 (HTML5) data, or other types of display instructions (e.g., instructions for a native application executing on the user device). The display instructions can cause the user device to present the interactive user interface elements that receive the user input, and to transmit input information in to the first computing system (e.g., in response to an interaction with a button, hyperlink, or other interactive element).

At step 325, the method 300 can include receiving, via the registration page, a first credential to be used to gain access to the secured web portal. The first credential can be any type of credential that can be utilized to authenticate the user. Such credentials are generally private information (e.g., known to the user and kept private). However, users often engage in electronic activity that reveals information about themselves during their day-to-day lives, and this information may be utilized as an authentication credential. Some examples of such information are pet names, which may be thought private by the user but are instead shared publicly on social media platforms. Other types of information may also be regularly revealed through social media or other public or semi-private channels. Some non-limiting examples of the first credential include a passcode, a secret code word, a password, a PIN, a device identifier, or a token or key value. Additionally or alternatively, the first credential can include a response to a security question provided via the registration page. The first credential can be provided using the interactive user interface elements of the registration page displayed at the user device.

At step 330, the method 300 can include determining that the first credential corresponds to a data element in the third set of user data elements. Upon receiving the first credential(s) from the user device, the first computing system can automatically verify whether the user credential is a compromised user credential (e.g., not actually private information). In doing so, the first computing system can determine whether the user-provided credential is suitable for protecting the security of the computing system. If the first credential is publicly available, the first credential may be easily guessed or brute forced by a potential malicious entity. To determine whether the first credential may be publicly disclosed, the first computing system can iterate through each data element in the third dataset (or use a suitable searching algorithm keyed to the first credential), and determine whether the first credential is included as a data element in the third dataset.

If the first credential is included in the third data set, the first computing system can set a flag indicating that the first credential is rejected, and proceed to execute step 335 of the method 300. Otherwise, if the first credential is not included in the third dataset, the first computing system can set a flag indicating that the first credential is suitable, and can proceed to execute step 345 of the method 300. In an embodiment, the first computing system can set the flag indicating that the first credential is rejected if the assurance score associated with the data element in the third dataset that the first credential matches is below a predetermined threshold. As described herein, a low assurance score can indicate that the information is publicly available and easily associated with the user. Alternatively, the first computing system can set the flag indicating that the first credential is suitable if the assurance score associated with the data element in the third dataset that the first credential matches is above a predetermined threshold. As described herein, a high assurance score may indicate that some of the information is available, but is either too impracticable to access for a malicious actor or may not easily be associated with the user (e.g., an ambiguous association, etc.).

At step 335, the method 300 can include transmitting, to the user device, an indication that the first credential is rejected. Upon setting the flag that indicates the first credential is rejected, the first computing system can generate and transmit an alert to the user device that indicates the first credential cannot be used to access the web portal. Indication may include a reason, or identify a source of the data element in the third dataset that matches the first credential (e.g., "This is a pet name published on your social media profile," etc.). The alert may prompt the user to enter in an alternative credential, for example, via one or more additional interactive user interface elements. These user interface elements may be similar to the user interface elements provided in step 320 of the method 300.

At step 340, the method 300 can include receiving, via the registration page, the alternative user credential, and determining that the alternative user credential is not in the third set of user data elements. The alternative user credential can be similar to the first credential. Some non-limiting examples of the alternative user credential include a passcode, a secret code word, a password, a PIN, a device identifier, or a token or key value. Additionally or alternatively, the alternative user credential can include a different response to a security question provided via the registration page. The alternative user credential can be provided using the interactive user interface elements of the registration page displayed at the user device. The alternative user credential can be different from the first user credential.

Upon receiving the alternative credential(s) from the user device, the first computing system can automatically verify whether the alternative credential is a compromised user credential (e.g., not actually private information). In doing so, the first computing system can determine whether the alternative credential is suitable for protecting the security of the computing system. If the alternative credential is publicly available, the alternative credential may be easily guessed or brute forced by a potential malicious entity. To determine whether the alternative credential may be publicly disclosed, the first computing system can iterate through each data element in the third dataset (or execute a suitable searching algorithm keyed to the alternative credential), and determine whether the alternative credential is included as a data element in the third dataset. If the alternative credential is included in the third data set, the first computing system can set a flag indicating that the alternative credential is rejected, and return to execute step 335 of the method 300. Otherwise, if the alternative credential is not included in the third dataset, the first computing system can set a flag indicating that the first credential is suitable, and can proceed to execute step 345 of the method 300.

In an embodiment, the first computing system can set the flag indicating that the alternative credential is rejected if the assurance score associated with the data element in the third dataset that the alternative credential matches is below a predetermined threshold. Alternatively, the first computing system can set the flag indicating that the alternative credential is suitable if the assurance score associated with the data element in the third dataset that the alternative credential matches is above a predetermined threshold.

At step 345, the method 300 can include registering the alternative user credential to a user profile (e.g., the primary profile 124), and granting, via a login page of the secured web portal, access to the user profile based on the alternative user credential. Registering the alternative user credential can include storing the alternative user credential in association with the user profile, and setting one or more permissions or other access rules to permit access to the user profile using the alternative user credential. Upon doing so, the first computing system can grant access to the primary profile via the web portal. The alternative access credential may be provided as input to a login page of the secured web portal to grant access. To do so, the first computing system can generate and provide additional display instructions to the user device. The display instructions may include JavaScript, HTML5 data, or other types of display instructions (e.g., instructions for a native application executing on the user device). The display instructions can cause the user device to present one or more user interfaces (e.g., application interfaces 120) that permit access, modification, and processing of the various data elements stored in the user profile.

B. Executing Machine-Learning Models to Detect Recurrent Data Relating to Network Security Various embodiments described herein relate to techniques for executing machine learning models to detect recurrent data relating to network security. As described herein, computer network security is paramount because modern computer networks are often utilized to share or transmit private or otherwise personally identifying information. The present techniques can be utilized to automatically scrape or otherwise access information relating to users to establish datasets including information from multiple secured and unsecured data sources. Various Internet databases, webpages, or other sources of public or semi-private information can be extracted using various techniques (e.g., monitoring online activity or electronic activity history, web scraping, obtaining data via smart devices or Internet of Things (IoT) devices, accessing social media accounts, etc.) can be utilized to detect whether network access credentials have potentially been compromised or fail to meet certain security thresholds.

The present techniques include the execution of trained artificial intelligence models to generate one or more scores for the various collected information, for example, to indicate whether obtained information about a user has been publicly disclosed or is otherwise easily associated with the user. The scores, and the data associated therewith, can be compared to the network credentials of the user to evaluate the potential security risk of utilizing the credential. If the credential poses a security risk, a new credential can be elicited or automatically generated to satisfy a security threshold. These techniques allow for establishing and maintaining optimal network security, even in view of seemingly or apparently innocuous data sharing by users in the network.

Figure 4:
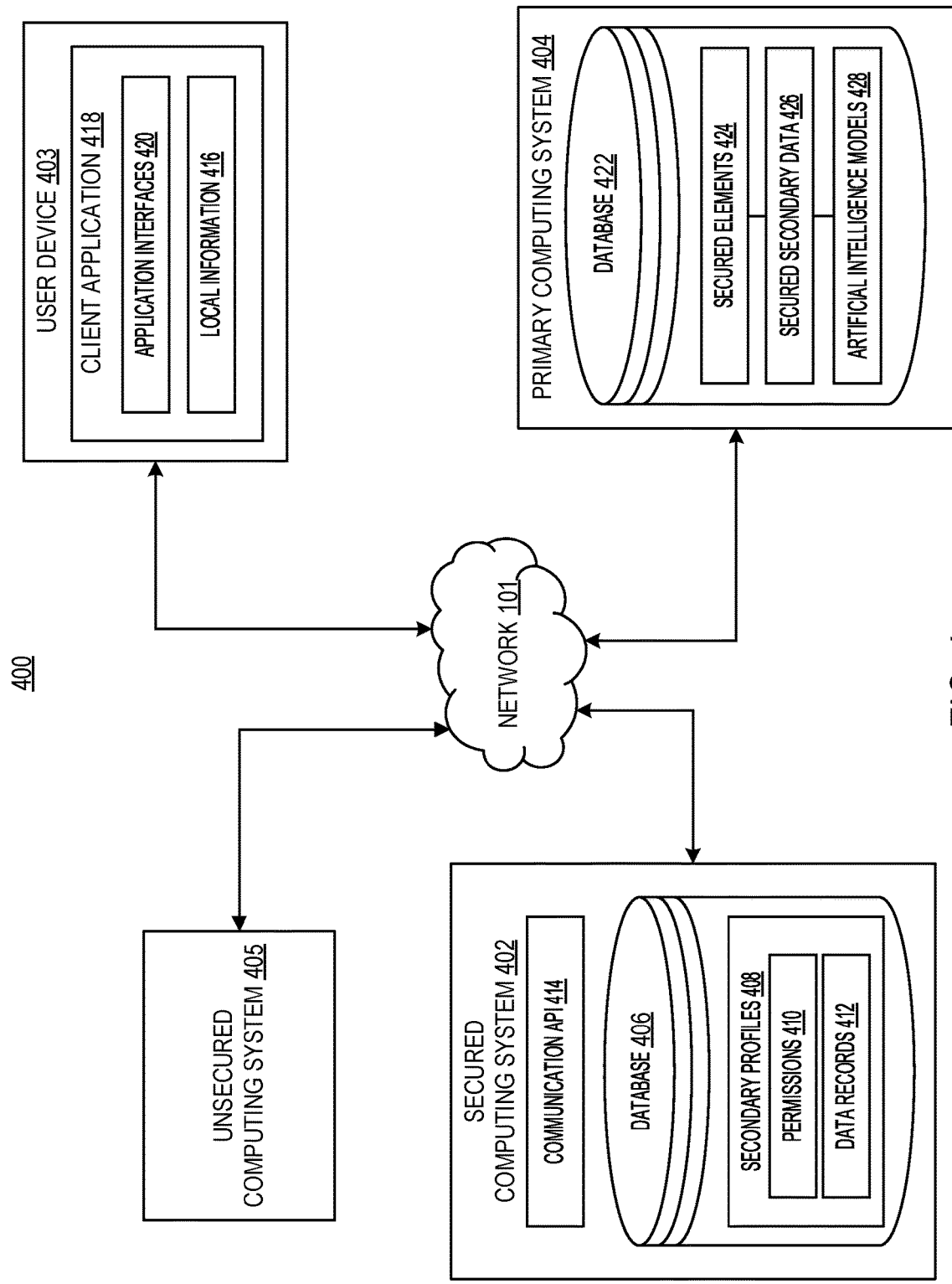
FIG. 4 is a block diagram of an example system for executing artificial intelligence models/machine-learning models to detect recurrent data relating to network security, in accordance with one or more example implementations.

Referring to FIG. 4, illustrated is a block diagram of an example system 400 for secure generation of authentication datasets from network activity, in accordance with one or more example implementations. The system 400 can be similar to the system 100 described herein in connection with FIG. 1, and include similar components and computing systems. For example, the system 400 may include at least one secured computing system 402 (more than one secured computing system 402 may be utilized, but is omitted here for visual clarity), one or more user devices 403 (which may include multiple computing devices of one or more users in one or more locations), one or more primary computing systems 404, and one or more unsecured computing systems 405. Each of the secured computing systems 102, the primary computing system 104, and the user device(s) 403 can be in communication with one another via the network 101, as described in connection with FIG. 1.

Each of the components of the system 400 may be similar in structure to, and include any of the structure or functionality of, the system 100 described in connection with FIG. 1, and vice versa. For example, the primary computing system 404 may be similar to the primary computing system 104, the secured computing system 402 can be similar to the secondary computing 102, the unsecured computing system 405 may also be similar to the secondary computing system 102 (e.g., in an embodiment in which the secondary computing system 102 hosts or otherwise provides public information about users), and the user device 403 can be similar to the user device 103.

Likewise, each of the components of the computing systems described in the system 400 may be similar to their counterparts in the system 100. The client application 418 may be similar to, and can implement any of the functionality of, the client application 118, including presenting the application interfaces 420 (which may be similar to the application interfaces 120) and creating or updating the local information 416 (which may be similar to the local information 116). The database 422 of the primary computing system 404 and the database 406 of the secured computing system 402 can be similar to the database 122 of the primary computing system 104 and the database 106 of the secondary computing system 404, respectively. The communication API 414 exposed or otherwise provided by the secured computing system 402 can be similar to the communication API 114 of the secondary computing system 102, and may facilitate communication between the secured computing system 402 and the primary computing system 404 or the user device 103 via the network 101. Additionally, the secondary profiles 408, and the permissions 410 and the data records 412 associated therewith, may be similar to the secondary profiles 108, the permissions 110, and the data records 112.

Each unsecured computing system 405 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. Each unsecured computing system 405 can include any or all of the components and perform any or all of the functions of the computer system 600 described herein in conjunction with FIG. 6.

The unsecured computing system 405 may be any type of computing system that can provide or publish public information. Publicly providing information can include providing information to any device with an internet connection that makes a corresponding request. The unsecured computing systems 405 can be maintained by, for example, information technology service providers, social media platforms, webservers, chatrooms, forums, or any other computing system that may maintain information about or relating to one or more users, and also provides such information to the public or in a semi-private environment. For example, unsecured computing systems 405 of non-financial institutions may be associated with marketing platforms, social media platforms, network environment platforms, network configuration platforms, or user databases, among others. The unsecured computing systems 405 may each include one or more network interfaces that facilitate communication with other computing systems of the system 400 via the network 101. In some implementations, one or more of the unsecured computing systems 405 may be owned or controlled by a single entity.

In an embodiment, the unsecured computing system 405 can maintain a social media profile, a chat profile, or any other type of user profile associated with the user. The unsecured computing system 405 can host and provide public webpages that report public information about various users. Additionally, the unsecured computing system 405 can provide webpages in which users may post or provide information about themselves. For example, the webpages may include may include one or more identifiers of users, along with information provided by the user (e.g., in a post). Such webpages can include pages providing social media activity, such as information relating to a user's social media posts, pictures, or online activity (e.g., records of purchases or other social media interactions, etc.).

The database 422 can store one or more secured elements 424. The secured elements 424 can include any type of credential that may be utilized to access a profile or account, such as a primary profile 124 of FIG. 1. Each set of secured elements 424 may correspond to a respective user, and may be identified by a corresponding user identifier. Some examples of secured elements 424 can include a username, password, answers to predetermined security questions, security questions that are provided by the user, an email address, a passcode, an encryption key, a secret code-word, device identifiers for use in a two-factor authentication technique, or a PIN, combinations thereof, or the like. The secured elements 424 can be used to restrict access to any information about the user, including personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), or other user or account data that is maintained or otherwise accessible to the primary computing system 424. Access to the aforementioned information may be granted by the primary computing system 424 upon receiving the security credential via a login prompt (e.g., one or more of the application interfaces 420) presented at the user device. One or more secured elements 424 may be stored locally at a user device as part of the local information 416.

The secured secondary data 426 can be associated with a respective primary profile 124, and can include information retrieved by the primary computing system 124 from the secondary computing systems 102 utilizing the techniques described herein. The secured secondary data 426 may be subsets of information stored as the data records 112 of the secondary computing systems 102. The secured secondary data 426 can include any data about the user that has been gathered via one or more computing systems other than the primary computing system 104 or directly from the user device 103 in a request to create or update a primary profile 124. This can include information scraped from websites, servers, or other online locations that the user may visit with one or more user devices 103, such as social media platforms, online chatrooms, online forums, public information databases, among other repositories of information. The primary computing system 104 can communicate with various computing systems of web services that the user is known to access (e.g., based on records of online activity transmitted to the primary computing system 104 via the client application 118 of the user device 103). This can include web scraping, communicating with the secondary computing system 102 via the communication API 114, among other information retrieval techniques.

The artificial intelligence models 428 can include one or more trained machine-learning models that are executed by the primary computing system 404 to carry out any of the functionality described herein. For example, the artificial intelligence models 428 can include trained natural language processing models that can identify or flag data elements (e.g., data elements in the secured elements 424, secured secondary data 426, or information retrieved from the unsecured computing system 405, as recurrent data elements. Recurrent data elements are any type of common, repeated, overused, or over-represented data elements in the aforementioned datasets, which may indicate issues with network security if such data elements are utilized as at least part of an authentication credential.

The artificial intelligence models 428 can include any type of model, and may be executed on retrieved text, image, video, or audio data to generate additional datasets indicating whether information is recurrent (e.g., recurrent data elements that are publicly available and are related to the user). Some examples of machine learning models can include neural networks (e.g., a DNN, a CNN, an RNN such as an LSTM model, combinations thereof, etc.), trained regression models (e.g., linear regression, SVM models, logistic regression, polynomial regression, ridge regression, Lasso regression, Bayesian linear regression, etc.), or other types of classifiers (e.g., naïve Bayes, decision trees, kNN, XGBoost models, etc.). The artificial intelligence models 428 can further include unsupervised machine-learning models. The aforementioned machine-learning models may also be utilized for any type of machine-learning or artificial intelligence (AI) performed task described herein.

The artificial intelligence models 428 can be trained using any suitable machine-learning training technique. For example, the artificial intelligence models 428 can be trained using supervised learning techniques, unsupervised learning techniques, or semi-supervised learning techniques. In an embodiment, the primary computing system 404 can train the artificial intelligence models using sets of training data. The sets of training data can include sets of information that are known to include recurrent data elements. Labels for each data element (e.g., indicating whether the data element is recurrent or non-recurrent) can be used as ground truth data. The primary computing system 404 may train the artificial intelligence models 428 using an iterative training process, and terminate the training process once a predetermined training condition has been reached. The artificial intelligence models 428 can receive information relating to the data elements as input, including the number of data sources in which the data element has appeared, the recency that the data element appeared, the data element itself, the locations in which the data element appeared, the ease of access (e.g., the number of page traversals required to reach the data element from an unsecured source, if any), among others factors relating to the data elements.

In an embodiment, the artificial intelligence models 428 can include trained models that may generate an assurance score for one or more data elements. As described herein, the assurance score can be a metric that indicates whether the particular identity element is public or private information (e.g., whether one would be able to derive the identity element from publicly available information). Similar training techniques can be performed to train the machine-learning model that generates an assurance score for one or more data elements. The artificial intelligence models 428 may be utilized by the primary computing system 104 (or in the execution of the method 300) to determine the assurance score for one or more data elements. Additionally, the assurance score for one or more data elements may be utilized to determine whether the data element corresponds is a recurrent data element (e.g., a low assurance score may indicate that the data element is recurrent, while a larger assurance score may indicate that the data element is not recurrent).

Figure 5:
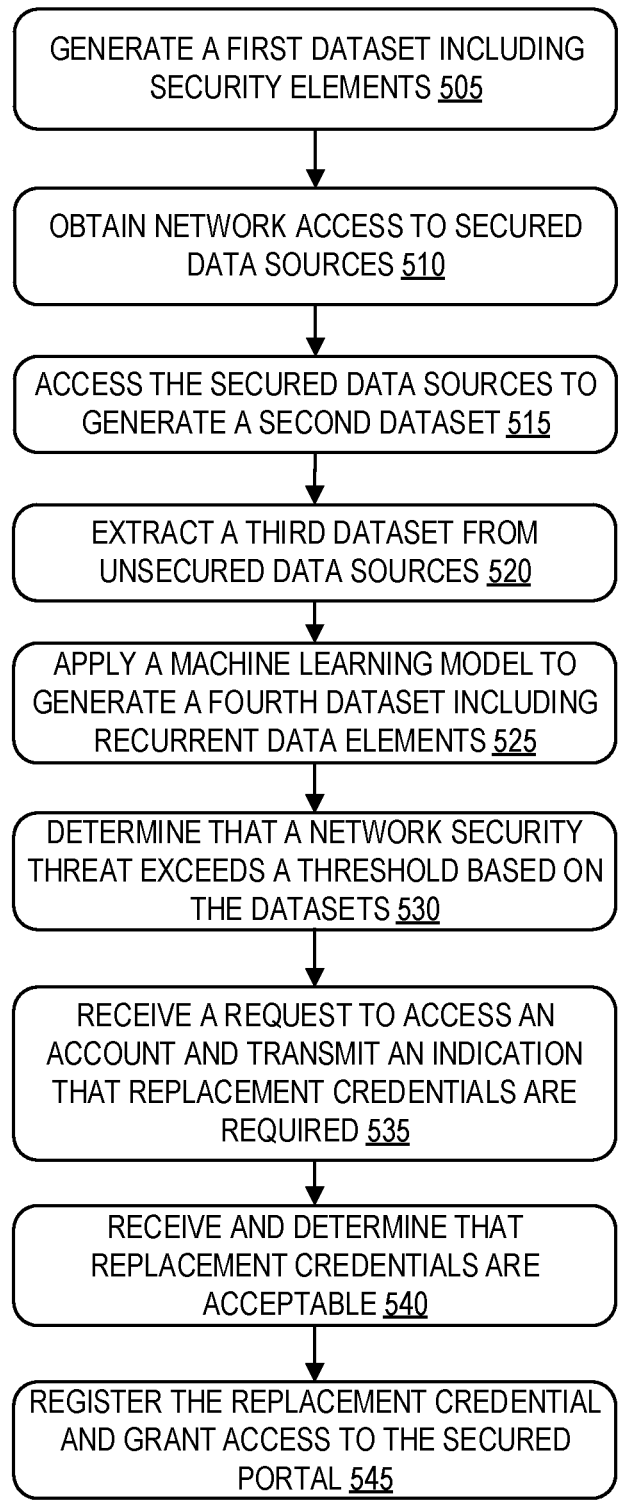
FIG. 5 is a flow diagram of an example method for executing machine-learning models to detect recurrent data relating to network security, in accordance with one or more example implementations.

Referring to FIG. 5, illustrated is a flow diagram of an example method 500 for secure generation of authentication datasets from network activity, in accordance with one or more example implementations. The method 500 can be a computer-implemented method. The method 500 may be implemented, for example, using any of the computing systems described herein, such as the primary computing system 404, the secured computing system 402, the user device 103, the unsecured computing system 405, or the computing system 600 described in connection with FIG. 6. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 500 may be performed simultaneously, or one or more operations may be performed as an alternative to another operation.

At step 505, the method 500 includes generating a first dataset comprising security elements (e.g., the secured elements 424) corresponding to one or more accounts (e.g., the primary profiles 124) administered by the first computing system (e.g., the primary computing system 404). The one or more accounts can include any number of accounts corresponding to a user, and can include profiles, financial accounts, debt accounts, credit accounts, non-financial accounts, or other types of information that may be secured with a credential. The security elements can include one or more credentials granting access to the various user data, and may include a username, password, answers to predetermined security questions, security questions that are provided by the user, an email address, a passcode, an encryption key, a secret code-word, device identifiers for use in a two-factor authentication technique, or a PIN, combinations thereof, or the like. The first dataset may include a set of said credentials that may correspond to various sets of user data (e.g., sets of passwords for different accounts, etc.).

In an embodiment, the first computing system can provide a web portal (e.g., one or more application interfaces 420) with a registration page for registering for a digital security service (e.g., a service for monitoring security breaches or threats, and/or for securing digital identity, digital assets, etc.), which enables the user to opt into the techniques described herein. For example, the user may transmit a request for the first computing system to assess the security of the security elements associated with the user. The web portal can include one or more interactive user interface elements that enable a user to select one or more security elements for which the service is enabled. Additionally, the web portal can enable the user to provide various authentication credentials to other secured computing systems (e.g., the secured computing systems 402), which the first computing system can utilize to access additional information related to the user in further steps of the method 500. In an embodiment, the first computing system can generate the first dataset in response to receiving the request to register for the digital security service.

At step 510, the method 500 includes obtaining network access to one or more secured data sources (e.g., the secured computing systems 402). The one or more secured data sources can be unfederated with respect to the first computing system. Unfederated computing systems are computing systems that are maintained, owned, and operated by separate entities that generally do not freely provide information to one another. Obtaining network access can include receiving or identifying access credentials for the one or more secured data sources. In an embodiment, the user can provide access credentials (e.g., the network access) for one or more secured data sources via the registration page of the web portal provided in step 505. In another embodiment, to access such data sources, the first computing system can execute or transmit an API call (e.g., the communications API 414) to one or more secured data sources. The API call may include a security token identifying the first computing system or the user that authorized access to the corresponding information at the secured data source. For example, the security token may be transmitted in a request for information in the second database relating to the user.

In order to ensure that the user has authorized a transfer of their information from the second database, the secondary computing system can access permissions (e.g., the permissions 410) associated with one or more data records (e.g., the data records 412) associated with the user to determine whether the first computing system is authorized to access the data records. If the permissions do not permit access to the data records by the primary computing system, the secured computing system can generate and transmit an alert to the first computing system indicating that the permissions are denied. If the permissions permit access to the data records by the primary computing system, the secured computing system can transmit the requested information. Additionally or alternatively, the second computing system can verify a security token transmitted in the request for the user information.

For example, prior to receiving the request for the user's information, the user can utilize the client application (e.g., the client application 418) on the user device to transmit a request for a security token to the second computing system. The request can indicate one or more portions of the user's data that the primary computing system is authorized to access (and any access rules such as time periods, expiration dates, etc.). Additionally, the request may identify the one or more secured data sources, and may be transmitted by the web portal provided in step 505. In response, the secured computing system can generate corresponding permissions, and generate a security token (e.g., using a hashing algorithm, a random number generator, or other token generation techniques) that acts as a surrogate value for those permissions.

The secured computing system can generate an association between the token and the user or the first computing system. The token is then provided to the user device, which can transmit the token to the primary computing system. The primary computing system can then utilize the token to request data for the first dataset from the second computing system. Upon receiving the security token, the second computing system compares the token to the security tokens that are associated with the user, and evaluates the permissions associated with the token as described herein (e.g., determining whether the first computing system is authorized to access the user data).

At step 515, the method 500 includes accessing the one or more secured data sources to generate a second dataset based on data in the second computing system. To access the secured data sources (e.g., one or more secured data sources 402), the first computing system can transmit one or more requests to the secured data sources for information (e.g., the secondary profiles 408, the data records 412, the permissions 410, etc.) associated with or identifying the user. The first computing system can access the one or more secured data sources, for example, by executing or otherwise transmitting requests via one or more APIs calls (e.g., the communications APIs 414) provided by the respective secured data sources. The information for the second data set may be periodically retrieved data from the one or more secured data sources, for example, according to a predetermined schedule or access policy.

Some example policies can include retrieving information from the one or more secured data sources by transmitting one or more API calls a weekly basis, a daily basis, a monthly basis, a semi-monthly basis, or other types of schedules. Transmitting, executing, performing, or otherwise accessing the one or more API calls may include transmitting the security token that identifies the first computing system to the respective secured data source (e.g., the secured data source that generated or is otherwise associated with the security token). The security token may identify the first account (e.g., a corresponding primary profile 124), the user, the user device (e.g., the user device 103), or any other computing device, account, profile, or data structure that corresponds to the user that requested or opted into the digital security service.

The second dataset (e.g., the secured secondary data 426) can be generated, for example, by storing the information retrieved from the one or more data sources in one or more data structures in a memory or database (e.g., the database 422) of the first computing system. The second dataset can be stored in association with an identifier of the user to which the data elements of the second dataset correspond. The first computing system can iterate through each data element in each set of data retrieved from each secured data source to identify common data elements. Counters associated with each data element (e.g., such as a name, address, or other information relating to a user) that track the number of secured data sources in which that data element appears. These counters can be used as input to the various machine-learning models described herein, and can indicate the prevalence or likelihood that the data element is known or publicly available. The second dataset may include any type of information relating to the user that may be retrieved from a secured data source, including documents (e.g., driver's license, social security card, medical documents, utility bills, etc.), audio records of the user (e.g., captured from conversations, social media posts, etc.), location data, or video recordings of the user (e.g., captured from various camera devices associated with the user, accessed from public records or form social media accounts of the user, etc.), among other types of information.

Various processing (e.g., natural language processing, audio-to-text, video recognition, etc.) can be performed to extract various information or data elements relating to the user. Natural language processing operations (e.g., executing additional machine-learning models or other types of image-to-text algorithms like optical character recognition) can be utilized to extract the information about the user. In some implementations, optical character recognition can be used to extract sections of text from the image(s), and then regular expression (regex) rules can be applied to the sections of text to identify and extract the user data. Machine-learning models may also be executed on retrieved text, image, video, or audio data to generate the second dataset. For example, different classifier or object detection models can be utilized to extract words, phrases, or other types of predetermined information about the user that could potentially be utilized as an authentication credential. Some examples of machine learning models (e.g., the artificial intelligence models 428) can include neural networks (e.g., a DNN, a CNN, an RNN such as an LSTM model, combinations thereof, etc.), trained regression models (e.g., linear regression, SVM models, logistic regression, polynomial regression, ridge regression, Lasso regression, Bayesian linear regression, etc.), or other types of classifiers (e.g., naïve Bayes, decision trees, kNN, XGBoost models, etc.). The aforementioned machine-learning models may also be utilized for any type of machine-learning or artificial intelligence performed task described herein.

At step 520, the method 500 includes extracting a third dataset based from data retrieved from one or more unsecured data sources (e.g., the unsecured data sources 405) that are unfederated with respect to the first computing system. Unfederated computing systems are computing systems that are maintained, owned, and operated by separate entities that generally do not freely provide information to one another. The unsecured data sources can be any type of data source that provides information about various users in a public or otherwise unsecured manner. For example, the information about a user stored or maintained by one or more unsecured data sources may be provided without utilizing a particular authentication credential (e.g., username, password, email, security token, passkey, etc.) of the user. Examples of unsecured data sources can include public websites or webpages that show information about users, social media pages that the user makes publicly available (e.g., public social media profile pages), public information databases that store information about various users, or private information databases that have a relatively low-cost of access (e.g., a small fee, etc.).

To extract the third dataset from the unsecured data sources, the first computing system can execute various web scraping operations over one or more web pages provided by the unsecured data sources. To perform web scraping, the first computing system can access and extract text information from one or more web pages provided by the unsecured data sources. The first computing system can iterate through and traverse web pages by following hyperlinks to various URLs that are present on homepages of websites that are known to maintain information about various users. The first computing system can extract the information about the user by accessing web pages that may be associated with the user (e.g., include the user's name, address, or other publicly available information), or may be accessed by the user (e.g., based on previous electronic activity provided by the user device). The information extracted from the web pages can be stored as part of the third dataset.

In some implementations, information for the third dataset can be retrieved from an unsecured computing system in response to a request received from the user device, or from a request received from another computing device (e.g., upon an indication of a data breach, etc.). For example, if the first computing system receives an indication that a data breach has occurred at a compromised computing system or that previously private information has been leaked or released to the public from a compromised computing system, the first computing system can access the leaked or breached information and update the second dataset with any leaked information relating to the user. To do so, the first computing system can determine whether the compromised computing system likely stored data about the user by scanning through any breached data to identify any data elements in the data leak or data breach that are present in the first dataset or the second dataset, or that include any known identifiers or data elements that are associated with the user.

Additionally, the first computing system can determine that the compromised computing system stored information about the user based on electronic activity associated with the user. For example, if the user engaged in one or more transactions with an entity that owns or maintains the compromised computing system, the first computing system can determine that the computing system likely included information relating to the user. The first computing system can also access previous online activity (e.g., interactions, page visits, etc.) by computing devices associated with the user to determine whether the user interacted with the compromised computing system. If so, the first computing system can determine that the compromised computing system likely stored at least some information corresponding to the user or devices of the user, and can access information relating to the data breach that occurred at the compromised computing system.

At step 525, the method 500 includes applying one or more machine-learning models (e.g., one or more of the artificial intelligence models 428) to the second dataset and the third dataset to generate a fourth dataset comprising recurrent data elements. The machine-learning models can include an NLP model. For example, the machine-learning models can include trained natural language processing models that can identify or flag data elements (e.g., data elements in the second dataset and the third dataset as recurrent data elements. Recurrent data elements are any type of common, repeated, overused, or over-represented data elements in the aforementioned datasets, which may indicate issues with network security if such data elements are utilized as at least part of an authentication credential.

The machine-learning models can include any type of model, and may be executed on retrieved text, image, video, or audio data to generate additional datasets indicating whether information is recurrent (e.g., recurrent data elements that are publicly available and are related to the user). Some examples of machine learning models can include neural networks (e.g., a DNN, a CNN, an RNN such as an LSTM model, combinations thereof, etc.), trained regression models (e.g., linear regression, SVM models, logistic regression, polynomial regression, ridge regression, Lasso regression, Bayesian linear regression, etc.), or other types of classifiers (e.g., naïve Bayes, decision trees, kNN, XGBoost models, etc.). The machine-learning models can further include unsupervised machine-learning models. The aforementioned machine-learning models may also be utilized for any type of machine-learning or artificial intelligence performed task described herein.

The machine-learning models can be trained using any suitable machine-learning training technique. For example, the machine-learning models can be trained using supervised learning techniques, unsupervised learning techniques, or semi-supervised learning techniques. In an embodiment, the first computing system can train the artificial intelligence models using sets of training data. The sets of training data can include sets of information that are known to include recurrent data elements. Labels for each data element (e.g., indicating whether the data element is recurrent or non-recurrent) can be used as ground truth data. The primary computing system 404 may train the machine-learning models using an iterative training process (e.g., to train one or more trainable parameters, such as weights or bias values of various layers or variables of the models to minimize a loss function), and terminate the training process once a predetermined training condition has been reached. The machine-learning models can receive information relating to the data elements as input, including the number of data sources in which the data element has appeared, the recency that the data element appeared, the data element itself, the locations in which the data element appeared, the ease of access (e.g., the number of page traversals required to reach the data element from an unsecured source, if any), among others factors relating to the data elements.

Natural language processing operations (e.g., executing additional machine-learning models or other types of image-to-text algorithms like optical character recognition) can be utilized to identify data elements that may be recurrent in any type of information, including images of documents, one or more video frames, audio clips, text data, or any other type of information relating to a user. In some implementations, optical character recognition can be used to extract sections of text from various images or video frames, and regex rules can be executed over the sections of text to identify one or more data elements. Machine-learning models may also be executed on retrieved text, image, video, or audio data to generate the fourth dataset. For example, different classifier or object detection models can be utilized to extract words, phrases, or other types of predetermined information about the user that could potentially be utilized as an authentication credential. The frequency with which the data elements appear in the second and third datasets, along with the various other signals or aspects of recurrent data described herein, can indicate whether a data element is recurrent. Additionally, the calculation of an assurance score may be performed for one or more of the data elements, for example, to determine whether the data elements are recurrent, as described herein. The fourth dataset can include any of the data elements that were identified as recurrent from the second and third datasets. Each data element in the fourth dataset may be stored in association with the respective assurance score for that data element, in an embodiment.

At step 530, the method 500 includes determining, based on the first dataset and the fourth dataset, that a network security threat corresponding to the first account exceeds a threshold. To do so, the first computing system can iterate through each data element in the fourth dataset, and identify any matches to corresponding data elements in the first dataset. As described above, the first dataset can include one or more credentials that authorize access to one or more accounts or profiles provided by the first computing system. Therefore, if data elements that are used for credentials are publicly known (e.g., based on their inclusion in the fourth dataset), the first computing system can determine that there is a potential security threat posed by the use of that data element as a security credential. This is because publicly known data may be utilized by attackers or other malicious entities to gain access to the accounts or profiles protected by the security credential by "brute forcing" the authentication credential with the known information.

In an embodiment, the degree of the security threat can be determined by comparing the assurance score of each element that is common between the first and fourth datasets to one or more security thresholds. As described herein, the assurance score can correspond to a degree to which information is publicly available. The more publicly available a data element is, the more likely that the data element poses a security threat if that data element is utilized as a security credential. In an embodiment, the first computing system can set a flag indicating that the data element corresponds to a security threat the assurance score associated with that data element is below a predetermined threshold. As described herein, a low assurance score can indicate that the information is publicly available and easily associated with the user. Alternatively, the first computing system can set the flag indicating that the data element does not pose a security threat the assurance score associated with that data element is above a predetermined threshold. As described herein, a high assurance score may indicate that some of the information is available, but is either too impracticable to access for a malicious actor or may not easily be associated with the user (e.g., an ambiguous association, etc.).

At step 535, the method 500 includes receiving, via a login page of a web portal, a request to access the first account, and transmitting an indication that replacement credentials are required to access the first account. The web portal can be a portal that can be utilized to access additional functionality of the first computing system. For example, the portal may be a web-enabled portal to access account information, alter user preferences, request various services, or to provide or upload private information relating to the user. In order to provide access to the web portal, the first computing system can provide one or more login user interfaces that enable a user to provide credentials to access the one or more various account or profile-related features provided by the first computing system. The login page may include various interactive user interface elements that can accept credentials (e.g., security questions, passwords, etc.) provided by the user. The web portal including the login page can be transmitted to the user device in the form of display instructions. The display instructions may include JavaScript, HTML5 data, or other types of display instructions (e.g., instructions for a native application executing on the user device). The display instructions can cause the user device to present the interactive user interface elements that receive the user input, and to transmit input information in to the first computing system (e.g., in response to an interaction with a button, hyperlink, or other interactive element).

Upon receiving the credential information in the request to access the account or profile, the first computing system can provide one or more indications to the user via the web portal indicating that the credential should be replaced with a new credential due to a potential security threat. Such indications can be transmitted for each data element in the first set that satisfies the threshold for a potential security threat, as determined in step 530. The indication can be transmitted, for example, in response to receiving a potentially compromised authentication credential to access the account. The indication can reflect the reason why the credential should be replaced (e.g., a data breach, the information was publicly shared by the user, etc.). The indication can include various additional interactive user interface elements that can accept additional or replacement credentials to access the account or profile maintained by the first computing system. The user interface elements can be presented at a user device in the form of one or more application interfaces (e.g., the application interfaces 420), and may be provided as additional display instructions that can include JavaScript, HTML5 data, or other types of display instructions.

At step 540, the method 500 includes receiving, via the web portal, one or more replacement credentials, and determining that the one or more replacement credentials are acceptable based on the fourth dataset. Once the request for additional credentials have been transmitted, the user can provide a replacement credential to access the account via the user interface elements provide din step 535. The replacement credentials can be similar to the first credential provided via the login screen. Some non-limiting examples of the alternative user credential include a passcode, a secret code word, a password, a PIN, a device identifier, answers to security questions, additional user-selected or user-provided security questions and corresponding answers, or a token or key value. Additionally or alternatively, the replacement user credential can include a different response to a security question provided via the login page at step 535. The replacement credential can be provided using the interactive user interface elements of the registration page displayed at the user device.

Upon receiving the alternative credential(s) from the user device, the first computing system can automatically verify whether the replacement credential is a compromised user credential (e.g., not actually private information). In doing so, the first computing system can determine whether the replacement credential is suitable for protecting the security of the computing system. If the replacement credential is publicly available, the alternative credential may be easily guessed or brute forced by a potential malicious entity. To determine whether the alternative credential may pose a security threat, the first computing system can iterate through the fourth dataset to determine whether any data elements in the fourth dataset includes, matches, or approximates the replacement credential.

To do so, the first computing system can iterate through each data element in the fourth dataset (or execute a suitable searching algorithm keyed to the replacement credential), and determine whether the replacement credential is included, matches, or approximates each data element in the fourth dataset. If the replacement credential in (e.g., is included in, matches, or approximates) any data elements of the fourth data set, the first computing system can set a flag indicating that the replacement credential is rejected, and a new replacement credential as described herein. Otherwise, if the replacement credential is not included in the fourth dataset, the first computing system can set a flag indicating that the replacement credential is suitable, and can proceed to execute step 545 of the method 500. In an embodiment, the first computing system can set the flag indicating that the replacement credential is rejected if the assurance score associated with the data element in the fourth dataset that the replacement credential is included in, matches, or approximates is below a predetermined threshold. Alternatively, the first computing system can set the flag indicating that the alternative credential is suitable if the assurance score is above a predetermined threshold.

At step 545, the method 500 includes registering the one or more replacement credentials to the first account, and granting, via the web portal, access to the first account based on the one or more replacement credentials. Registering the replacement user credential can include storing the replacement user credential in association with the user profile, and setting one or more permissions or other access rules to permit access to the user profile or account using the replacement user credential. Upon doing so, the first computing system can grant access to the primary profile via the web portal. The replacement access credential may be provided as input to a login page of the secured web portal to grant access. To do so, the first computing system can generate and provide additional display instructions to the user device. The display instructions may include JavaScript, HTML5 data, or other types of display instructions (e.g., instructions for a native application executing on the user device). The display instructions can cause the user device to present one or more user interfaces (e.g., application interfaces 420) that permit access, modification, and processing of the various data elements stored in the user profile or account.

C. Computing and Network Environment

Figure 6:
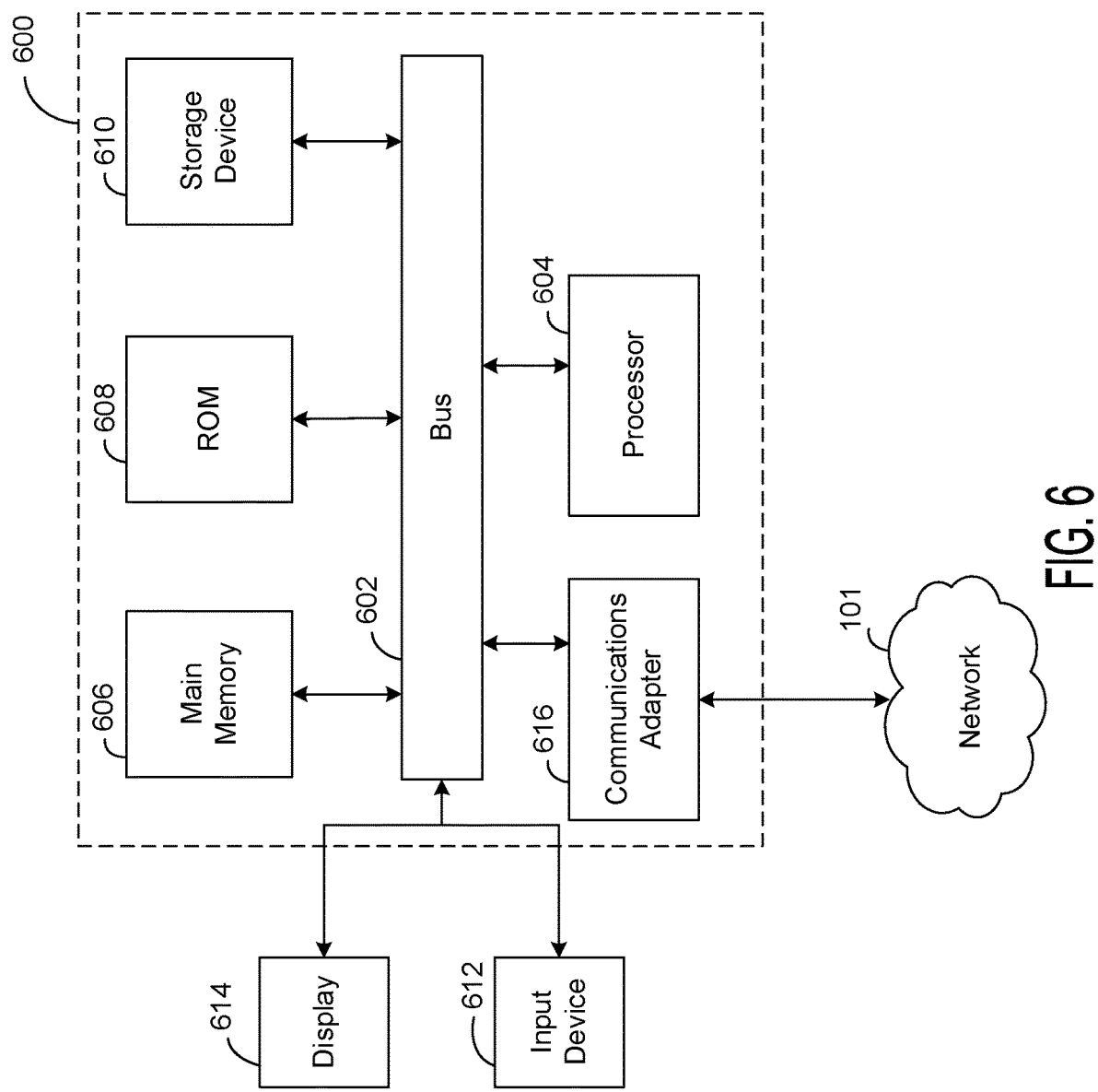
FIG. 6 is a component diagram of an example computing system suitable for use in the various arrangements described herein, in accordance with one or more example implementations.

FIG. 6 is a component diagram of an example computing system suitable for use in the various implementations described herein, according to an example implementation. For example, the computing system 600 may implement an example trusted computing system 102, user device 103, or primary computing system 104 of FIG. 1, or an example secured computing system 402, user device 403, primary computing system 404, or unsecured computing system 405 of FIG. 4, or various other example systems and devices described in the present disclosure.

The computing system 600 includes a bus 602 or other communication component for communicating information and a processor 604 coupled to the bus 602 for processing information. The computing system 600 also includes main memory 606, such as a RAM or other dynamic storage device, coupled to the bus 602 for storing information, and instructions to be executed by the processor 604. Main memory 606 can also be used for storing position information, temporary variables, or other intermediate information during execution of instructions by the processor 604. The computing system 600 may further include a read only memory (ROM) 608 or other static storage device coupled to the bus 602 for storing static information and instructions for the processor 604. A storage device 610, such as a solid-state device, magnetic disk, or optical disk, is coupled to the bus 602 for persistently storing information and instructions.

The computing system 600 may be coupled via the bus 602 to a display 614, such as a liquid crystal display, or active matrix display, for displaying information to a user. An input device 612, such as a keyboard including alphanumeric and other keys, may be coupled to the bus 602 for communicating information, and command selections to the processor 604. In another implementation, the input device 612 has a touch screen display. The input device 612 can include any type of biometric sensor, or a cursor control, such as a mouse, a trackball, or cursor direction keys, for communicating direction information and command selections to the processor 604 and for controlling cursor movement on the display 614.

In some implementations, the computing system 600 may include a communications adapter 616, such as a networking adapter. Communications adapter 616 may be coupled to bus 602 and may be configured to enable communications with a computing or communications network 101 and/or other computing systems. In various illustrative implementations, any type of networking configuration may be achieved using communications adapter 616, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 600 in response to the processor 604 executing an implementation of instructions contained in main memory 606. Such instructions can be read into main memory 606 from another computer-readable medium, such as the storage device 610. Execution of the implementation of instructions contained in main memory 606 causes the computing system 600 to perform the illustrative processes described herein. One or more processors in a multi-processing implementation may also be employed to execute the instructions contained in main memory 606. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method implemented by a first computing system comprising a server, the method comprising:
    accessing, by the first computing system, a secured data source to generate a first dataset comprising a first set of user data elements in the secured data source, wherein the secured data source is local or remote to the first computing system;
    extracting, by the first computing system, information from one or more unsecured internet data sources to generate a second dataset comprising a second set of user data elements in the one or more unsecured internet data sources, wherein the unsecured internet data sources are remote to the first computing system and are maintained by one or more other computing systems that are unfederated with respect to the first computing system;
    generating, by the first computing system, a third set of user data elements comprising data elements found in both the first set of user data elements and the second set of user data elements;
    providing, by the first computing system over the internet, to a user computing device of a user, a secured web portal comprising a registration page;
    receiving, by the first computing system, via the registration page, a user credential to be used to gain access to the secured web portal;
    determining, by the first computing system, that the user credential corresponds to a data element in the third set of user data elements;
    transmitting to the user device, by the first computing system, an indication that the first credential is rejected;
    receiving, by the first computing system via the registration page, an alternative user credential, and determining that the alternative user credential is not in the third set of user data elements;
    registering, by the first computing system, the alternative user credential to a user account; and
    granting, by the first computing system, via a login page of the secured web portal, access to the user account based on the alternative user credential.

2. The method of claim 1, further comprising determining, by the first computing system, an assurance metric for the third set of user data elements.

3. The method of claim 2, wherein the assurance metric is based at least in part on a number of data sources in which the third set of user data elements was found.

4. The method of claim 2, wherein the assurance metric is based at least in part on a characteristic of the one or more of the unsecured internet data sources.

5. The method of claim 1, wherein the secured data source is a first database maintained by the first computing system.

6. The method of claim 5, wherein data elements in the secured data source were obtained directly from the user.

7. The method of claim 1, wherein the secured data source is a second database maintained by a second computing system that is unfederated with respect to the first computing system.

8. The method of claim 7, wherein accessing the secured data source comprises transmitting, by the first computing system, an application programming interface (API) call to the second computing system.

9. The method of claim 8, wherein the API call comprises a security token identifying the first computing system or the user.

10. The method of claim 8, wherein the API call comprises a security token identifying the user.

11. The method of claim 1, wherein extracting the information from the one or more unsecured internet data sources comprises web scraping the information from one or more web pages.

12. The method of claim 11, wherein extracting the information from the one or more unsecured internet data sources comprises web scraping the information from a plurality of web pages of a plurality of other computing systems that are unfederated with respect to the first computing system.

13. The method of claim 1, wherein the user credential is a passcode.

14. The method of claim 1, wherein the user credential is a response to a security question provided via the registration page.

15. A first computing system comprising a server, the first computing system comprising one or more processors configured to: access a secured data source to generate a first dataset comprising a first set of user data elements in the secured data source, wherein the secured data source is local or remote to the first computing system; extract information from one or more unsecured internet data sources to generate a second dataset comprising a second set of user data elements in the one or more unsecured internet data sources, wherein the unsecured internet data sources are remote to the first computing system and are maintained by one or more other computing systems that are unfederated with respect to the first computing system; generate a third set of user data elements comprising data elements found in both the first set of user data elements and the second set of user data elements; provide, over the internet, to a user computing device of a user, a secured web portal comprising a registration page; receive, via the registration page, a user credential to be used to gain access to the secured web portal; determine that the user credential corresponds to a data element in the third set of user data elements; transmit, to the user device, an indication that the first credential is rejected; receive, via the registration page, an alternative user credential, and determine that the alternative user credential is not in the third set of user data elements; register the alternative user credential to a user account; and grant, via a login page of the secured web portal, access to the user account based on the alternative user credential.

16. The first computing system of claim 15, wherein the one or more processors are further configured to determine an assurance metric for the third set of user data elements, and wherein the assurance metric is based at least in part on one of (i) a number of data sources in which the third set of user data elements was found, or (ii) a characteristic of the one or more of the unsecured internet data sources.

17. The first computing system of claim 15, wherein the secured data source is a first database maintained by the first computing system, and wherein data elements in the secured data source were obtained directly from the user.

18. The first computing system of claim 15, wherein the secured data source is a second database maintained by a second computing system that is unfederated with respect to the first computing system, and wherein the one or more processors are configured to access the secured data source by transmitting an API call to the second computing system.

19. The first computing system of claim 15, wherein extracting the information from the one or more unsecured internet data sources comprises web scraping the information from a plurality of web pages of a plurality of other computing systems that are unfederated with respect to the first computing system.

20. The first computing system of claim 15, wherein the user credential is a passcode or a response to a security question provided via the registration page.

\* \* \* \* \*